United States Patent [19]
Goto et al.

[11] Patent Number: 5,052,021
[45] Date of Patent: Sep. 24, 1991

[54] DIGITAL SIGNAL DECODING CIRCUIT AND DECODING METHOD

[75] Inventors: Tadamasa Goto, Hino; Kazuo Yamamoto, Hachioji; Takahisa Hayashi, Hino; Shunsuke Koike, Yokohama, all of Japan

[73] Assignee: Kabushiki Kaisha Toshiba, Kawasaki, Japan

[21] Appl. No.: 492,947

[22] Filed: Mar. 13, 1990

[30] Foreign Application Priority Data

| May 19, 1989 | [JP] | Japan | 1-125918 |
| May 19, 1989 | [JP] | Japan | 1-125919 |
| May 19, 1989 | [JP] | Japan | 1-125920 |
| May 19, 1989 | [JP] | Japan | 1-125928 |
| Dec. 14, 1989 | [JP] | Japan | 1-322714 |

[51] Int. Cl.$^5$ .......................................... H04L 25/06
[52] U.S. Cl. ................................... 375/76; 328/146; 307/358
[58] Field of Search .............. 375/17, 76; 307/358, 307/359, 518, 543; 328/146; 329/318

[56] References Cited

U.S. PATENT DOCUMENTS

| 3,688,205 | 8/1972 | Burger | 375/76 |
| 3,832,577 | 8/1974 | Harr | 328/162 |
| 3,838,448 | 9/1974 | Garde et al. | 375/76 |
| 3,908,169 | 9/1975 | Tong | 375/76 |
| 3,947,769 | 3/1976 | Rousos et al. | 375/76 |
| 4,339,727 | 7/1982 | Kage et al. | 307/358 |
| 4,540,897 | 9/1985 | Takaoka et al. | 375/76 |
| 4,631,737 | 12/1986 | Davis et al. | 375/76 |
| 4,939,750 | 7/1990 | Nakamura | 375/76 |

Primary Examiner—Stephen Chin
Attorney, Agent, or Firm—Cushman, Darby & Cushman

[57] ABSTRACT

A digital signal decoding circuit of this invention includes a detection circuit, a reference signal generation circuit, and a discrimination circuit. The detection circuit detects central values of an amplitude in each bit of interest of a received digital signal. The reference signal generation circuit generates a reference signal having a signal value according to the central value detected by the detection circuit. The discrimination circuit compares the signal value of the received digital signal with a signal value of the reference signal generated by the reference signal generation circuit, thereby outputting a decoded binary signal.

13 Claims, 14 Drawing Sheets

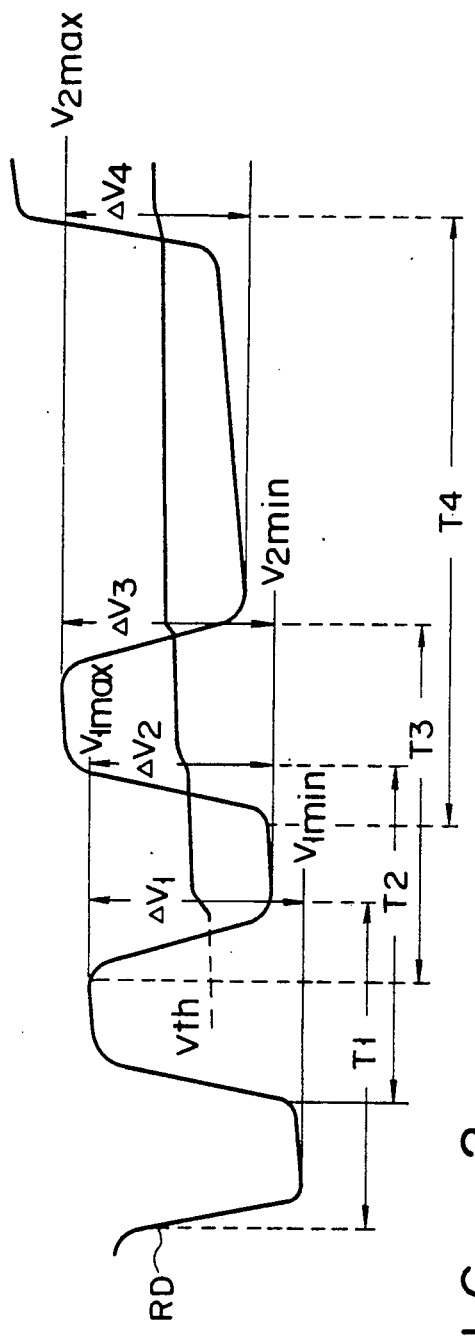
F I G. 2
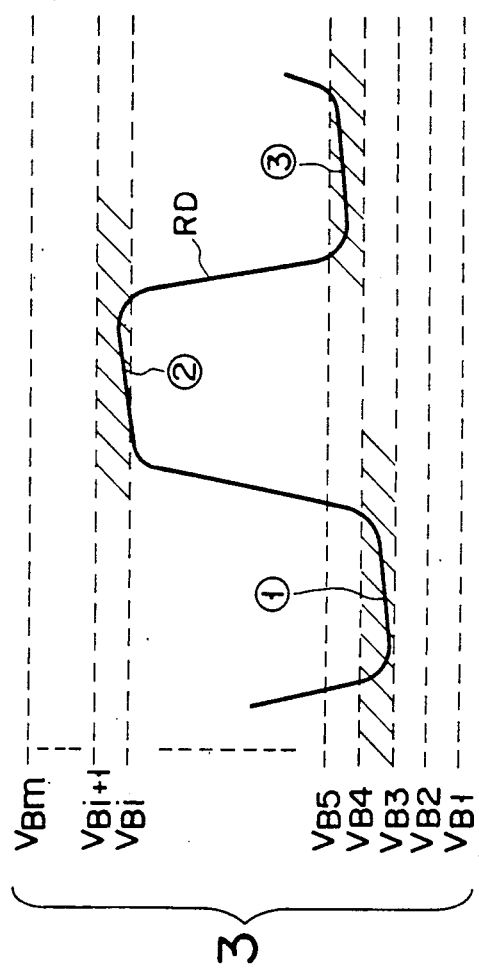
F I G. 3

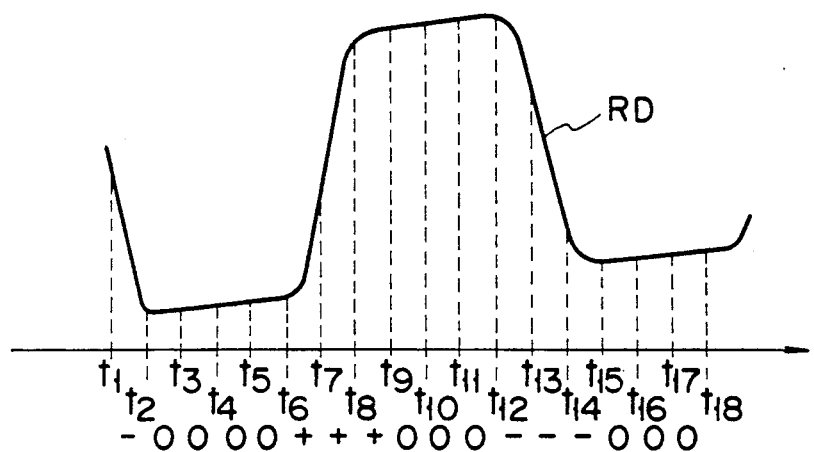
F I G. 4
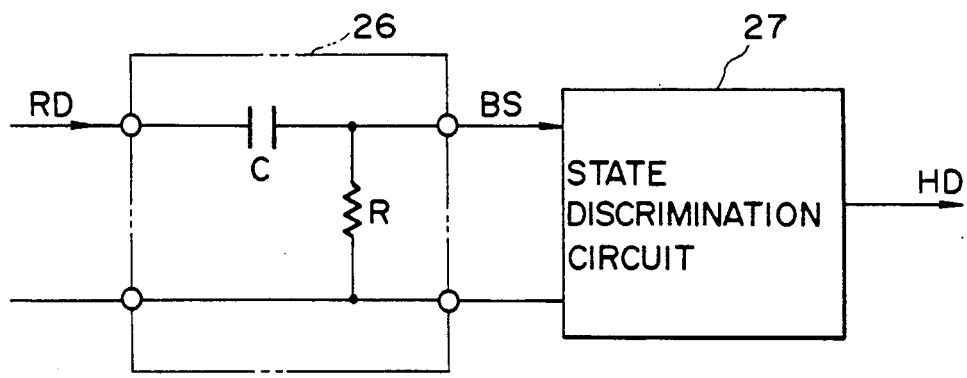
F I G. 5
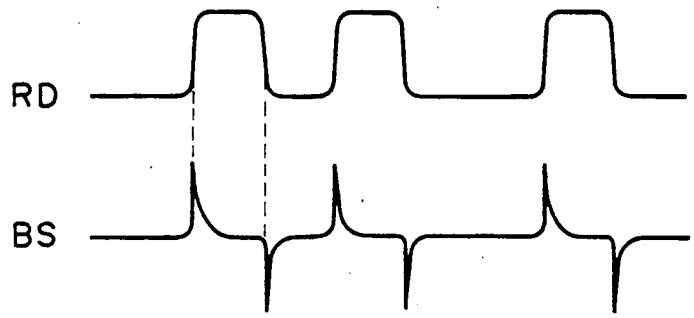
F I G. 6

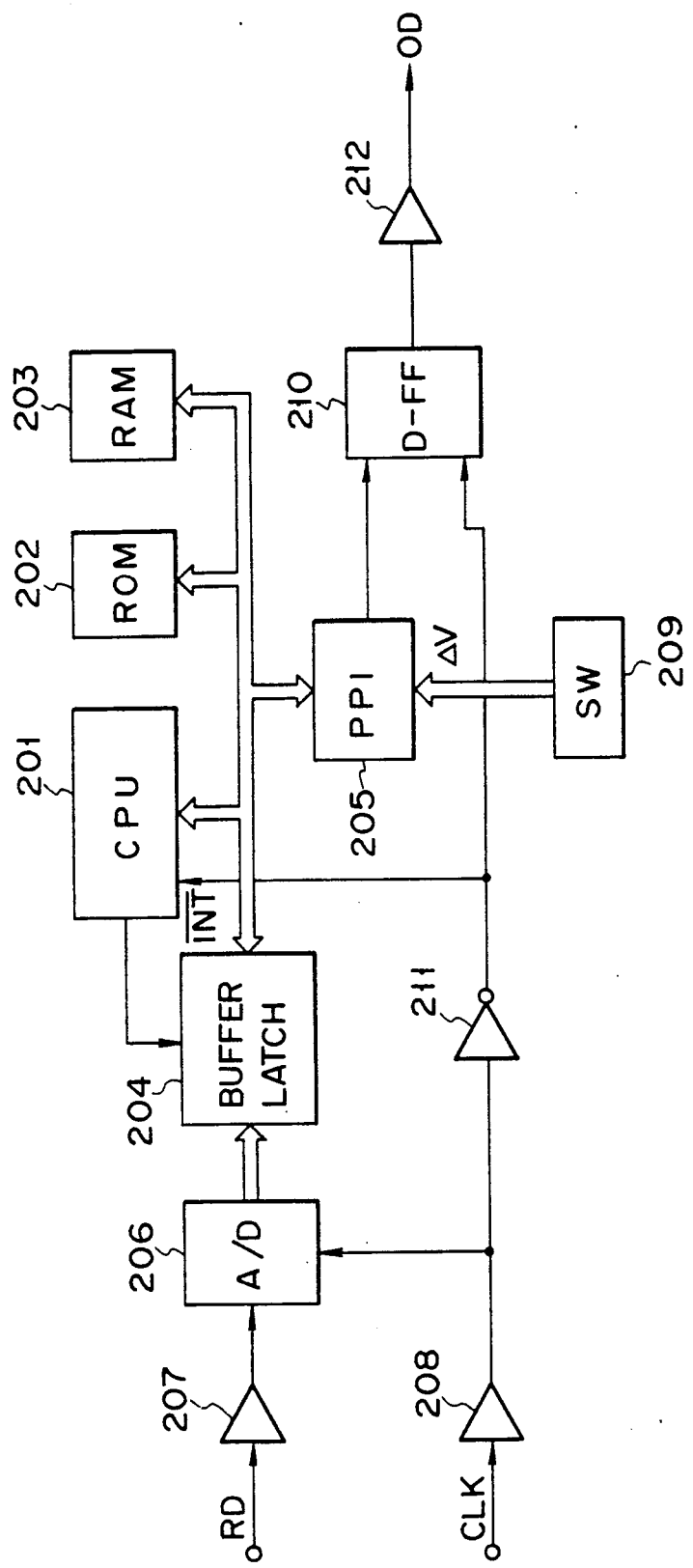
F I G. 11

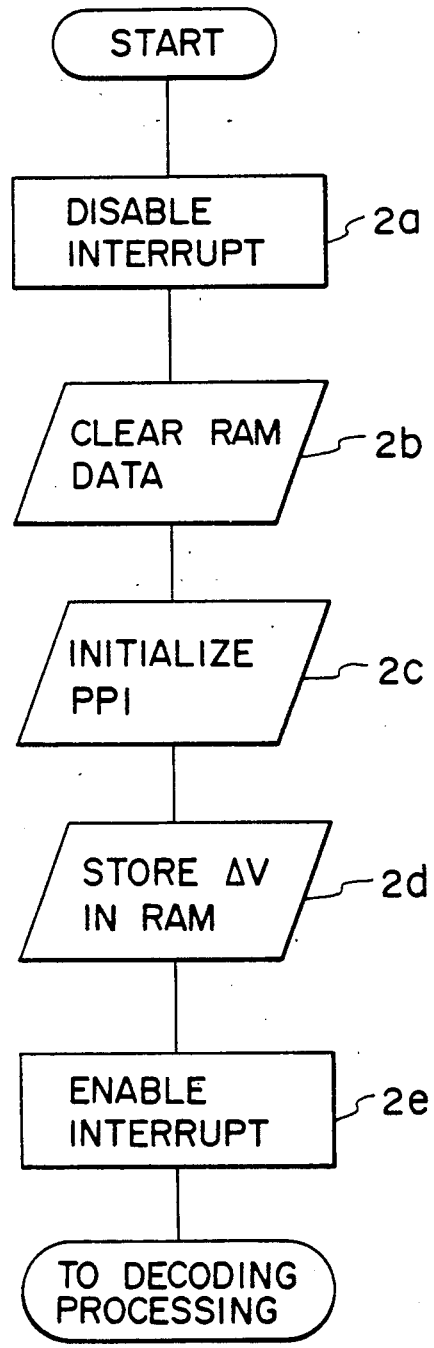
F I G. 12

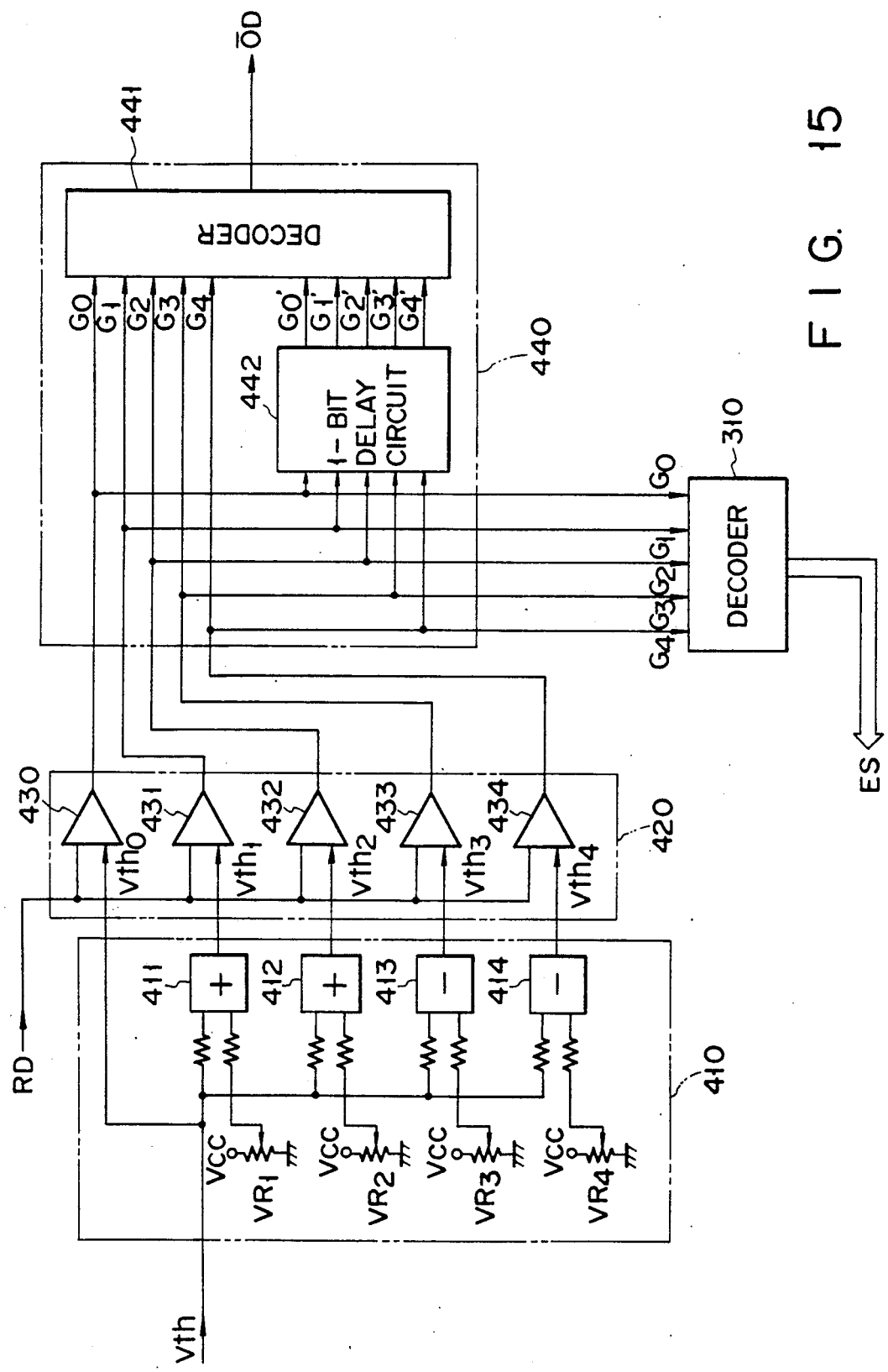
F I G. 15

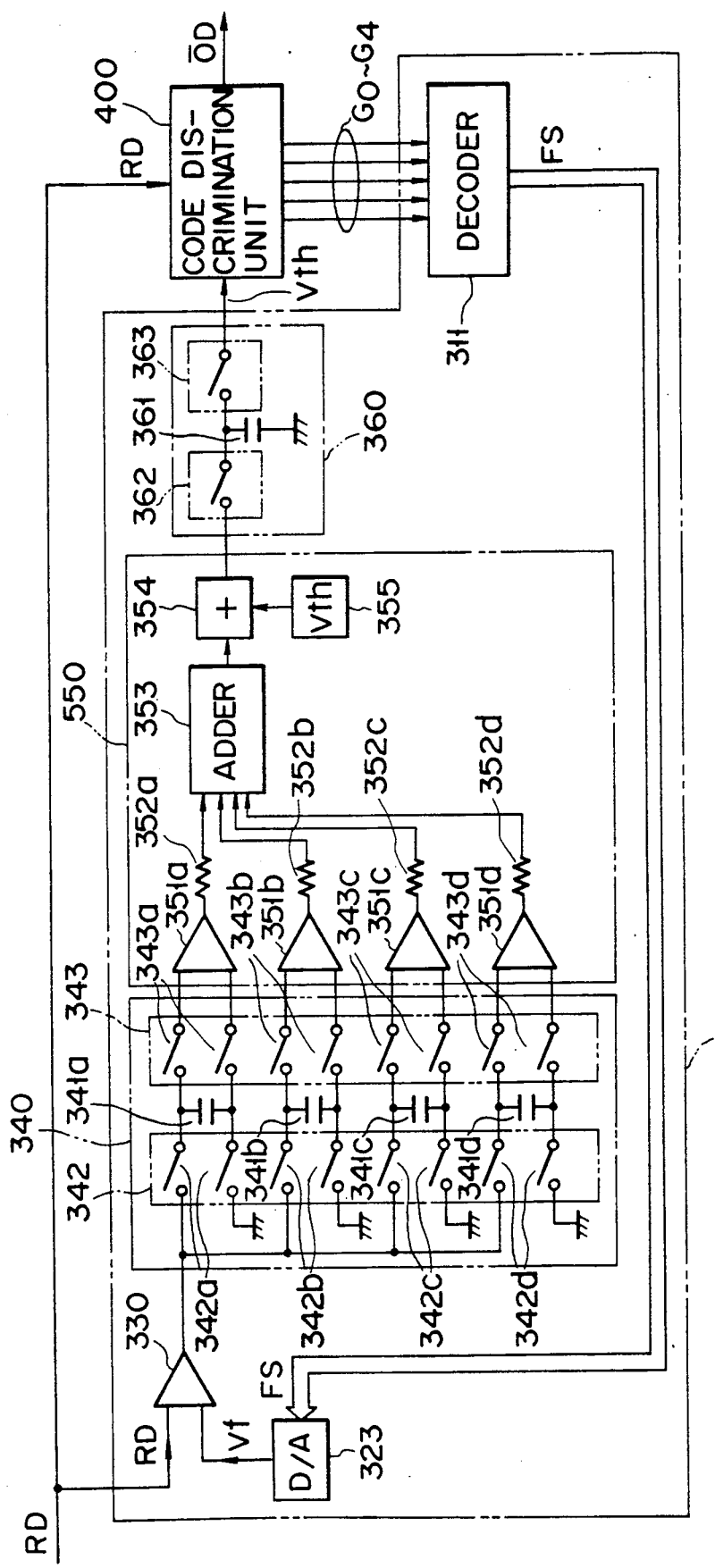
F I G. 18

DIGITAL SIGNAL DECODING CIRCUIT AND DECODING METHOD

BACKGROUND OF THE INVENTION

1. Field of the Invention

The present invention relates to a digital signal decoding circuit used for discriminating a code of a received digital signal in, e.g., a digital radio communication system.

2. Description of the Related Art

In a digital radio communication system, a transmission station converts codes of a digital signal, i.e., "1" and "0" into a change in frequency or voltage value, and transmits the signal. A reception station receives and demodulates a signal sent from the , transmission side, and compares the received digital signal with a signal level of a reference signal to discriminate the codes ("1" and "0").

A conventional decoding circuit of this type has the following problems. More specifically, a reference signal level is fixed in advance to a predetermined value. For example, assume that a variation in modulation/demodulation frequency or a variation in voltage value occurs in a transmission or reception station, and a DC level of a received digital signal is changed. In this case, accurate code discrimination cannot be performed, and as a result, a decoded output includes an error.

SUMMARY OF THE INVENTION

It is an object of the present invention to provide a digital signal decoding circuit which can accurately decode a received digital signal without being influenced by a change in DC level of the received digital signal.

It is another object of the present invention to provide a digital signal decoding circuit which can eliminate an influence of a change in signal value of a received digital signal even if the signal value of the received digital signal is temporarily and abruptly changed due to noise components.

It is still another object of the present invention to provide a digital signal decoding circuit which can accurately decode a received digital signal without being influenced by a change in amplitude of the received digital signal.

In order to achieve the object, according to an aspect of the present invention, the digital signal decoding circuit comprises a detector, a reference signal generator, and a discriminator. The detector detects a central value of an amplitude of each bit of interest of a received digital signal. The reference signal generator generates a reference signal having a signal value according to the central value detected by the detector. The discriminator compares the signal value of the received signal value with that of the reference signal generated by the reference signal generator in each bit of interest, thereby outputting a decoded binary signal.

As a result, according to the present invention, a signal level of a reference signal is always set to be a central value of a received digital signal. For this reason, even if a variation in modulation/demodulation frequency or in voltage value occurs in a transmission or reception station and a DC level of a received digital signal is changed accordingly, the signal level of the reference signal can be changed to follow the change in DC level. Therefore, the codes "1" and "0" of the received digital signal can always be discriminated based on an optimal reference signal level. Thus, high-quality decoding free from errors can be executed.

As the detector for detecting a central value of an amplitude, a circuit for detecting maximum and minimum values of an amplitude of each bit of interest of a received digital signal, and obtaining the central value of the amplitude of the received digital signal on the basis of the detected maximum and minimum values is used. Furthermore, as another detector for obtaining a central value of an amplitude, a circuit for detecting one of maximum and minimum values of an amplitude of each bit of interest of a received digital signal, and adding/subtracting a predetermined offset value to/from the detected signal value to obtain the central value of the amplitude of the received digital signal is used. By using these circuits, the central value of the amplitude of the received digital signal can be easily detected.

In order to achieve another object, according to another aspect of the present invention, the digital signal decoding circuit further comprises an average value detector. The average value detector obtains an average value of central values detected for a plurality of bits of interest. The reference signal generator generates a reference signal having a signal value according to the average value.

According to the present invention, the average value detector obtains an average value of central values of amplitudes obtained for a plurality of previous bits of interest, and a signal value of a reference signal is set on the basis of this average value. For this reason, even if an amplitude value of a received digital signal is temporarily and abruptly changed due to noise components, a reference signal level can be prevented from being set according to the central value of the amplitude which suffers from the influence of the change. Therefore, a stable reference signal can always be generated, and accurate code discrimination can be executed while eliminating a influence of noise components.

In order to achieve the still another object, according to still another aspect of the present invention, a signal value of a received digital signal is detected on the basis of a reference signal level, and codes of the received digital signal are discriminated based on the detected signal value and a signal value detected for a previous bit of interest. Parameter data is generated according to the signal value of the received digital signal, and data associated with the DC level of the received digital signal is detected on the basis of the parameter data and the signal value of the received digital signal. A reference signal level is generated on the basis of an average value of data associated with the DC level. More specifically, according to the present invention, code discrimination of the present bit of interest is performed with reference to a signal value detected for a previous bit of interest (e.g., a signal value of an immediately preceding bit of interest). In accordance with the signal value of the received digital signal, the DC level (e.g., the central value of an amplitude) of the received digital signal is obtained, and a reference signal level is set based on the DC level.

Therefore, according to the still another aspect of the present invention, even if an amplitude value of a received digital signal is changed according to a code pattern, a reference signal level is kept stable without being influenced by the change in amplitude. For this reason, a code discrimination error caused by the change in amplitude of the received digital signal can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2 to 4 are signal waveform charts for explaining an operation of the decoding circuit shown in FIG. 1;

FIG. 5 is a block diagram for explaining a modification of the decoding circuit shown in FIG. 1;

FIG. 6 is a signal waveform chart for explaining an operation of the circuit shown in FIG. 5;

FIG. 11 is a block diagram showing an arrangement of a digital signal decoding circuit according to the third embodiment of the present invention;

FIGS. 12 and 13 are flow charts showing control sequences of a CPU of the decoding circuit shown in FIG. 11;

FIG. 15 is a circuit diagram partially showing the arrangement of the decoding circuit shown in FIG. 14;

FIG. 18 is a block diagram showing an arrangement of a digital signal decoding circuit according to the fifth embodiment of the present invention.

DETAILED DESCRIPTION OF THE PREFERRED EMBODIMENTS

First Embodiment

Figure 1:
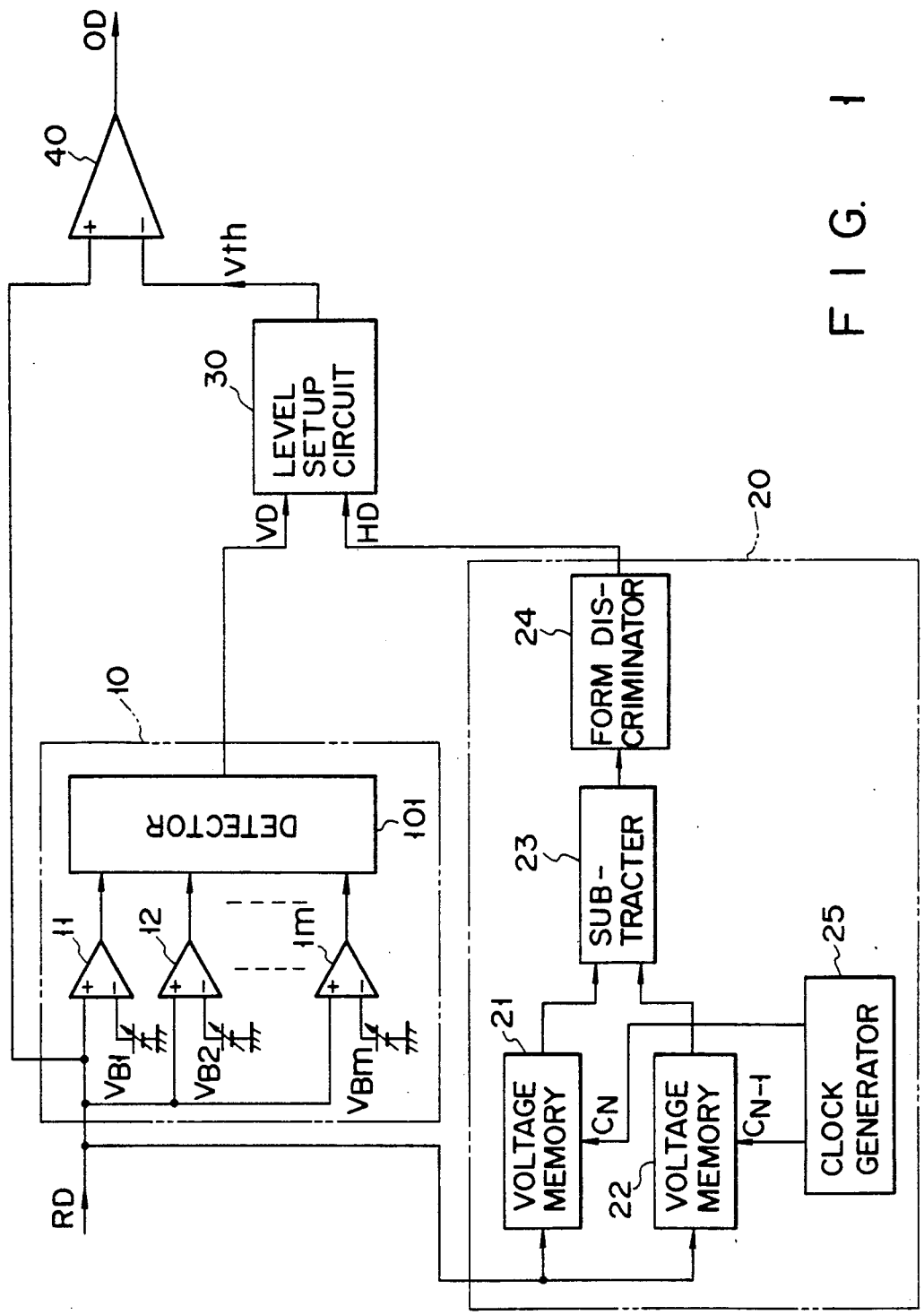
FIG. 1 is a block diagram showing an arrangement of a digital signal decoding circuit according to the first embodiment of the present invention.

FIG. 1 is a block diagram showing an arrangement of a digital signal decoding circuit according to the first embodiment of the present invention.

The decoding circuit comprises a first detection circuit 10, a second detection circuit 20, a level setup circuit 30, and a comparison circuit 40.

The first detection circuit 10 detects a signal value of a received digital signal RD, and comprises a plurality of comparators 11 to 1$m$, and a detector 101 for detecting a voltage range. The plurality of comparators 11 to 1$m$ compare the received digital RD with predetermined reference voltages $V_{Bl}$ to $V_{Bm}$. The comparators output detection signals each of which goes to "H" level when the signal value of the received digital signal RD is equal to or larger than a corresponding one of the reference voltages $V_{Bl}$ to $V_{Bm}$, and otherwise, goes to "L" level. The reference voltages $V_{Bl}$ to $V_{Bm}$ are set as follows. More specifically, the voltage $V_{B1}$ is set to be a ground level. The voltage $V_{B2}$ is set to be a value obtained by adding a given voltage value to the voltage $V_{Bl}$, and the voltage $VB_3$ is set to be a value obtained by adding the given voltage value to the voltage $V_{B2}$. Similarly, the voltages $V_{B4}$ to $V_{Bm}$ are set to be values obtained by adding the given voltage value to the voltages $V_{B3}$ to $V_{Bm-1}$, respectively. The detector 101 comprises, e.g., an encoder. The detector 101 encodes the detection signals output from the plurality of comparators 11 to 1$m$ and outputs, by this encoding, signal value detection data VD representing a voltage range to which the signal value of the presently received digital signal RD belongs. The signal value detection data VD is supplied to the level setup circuit 30.

The second detection circuit 20 is used to detect a change form of the signal value of the received digital signal RD, and includes two voltage memories 21 and 22, and a clock generator 25. The clock generator 25 generates two different sampling clocks $C_N$ and $C_{N-1}$. The frequencies of these sampling clocks $C_N$ and $C_{N-1}$ are set to be sufficiently higher than that of a transfer clock CLK, and their phases are set to be shifted by one clock from each other. The voltage memories 21 and 22 can be constituted by combining capacitors and switches. These voltage memories 21 and 22 sample and hold the signal value of the received digital signal RD in synchronism with the sampling clocks $C_N$ and $C_{N-1}$ generated by the clock generator 25, respectively. These held voltage values are supplied to a subtracter 23. The subtracter 23 subtracts the signal values output from the voltage memories 21 and 22 to detect a difference therebetween. The detected difference signal is supplied to a form discriminator 24. The form discriminator 24 discriminates a change form of the signal value of the received digital signal RD based on the value and polarity (positive or negative) of the difference signal every time it receives the difference signal from the subtracter 23. The change form represents whether the value is rising or falling, and whether it is a constant. Discrimination data HD obtained by the discrimination is supplied to the level setup circuit 30.

The level setup circuit 30 sets and outputs a reference signal level Vth on the basis of the signal value detection data VD and the discrimination data HD, and comprises, e.g., an A/D converter, a microprocessor, and a D/A converter. In the level setup circuit 30, the discrimination data HD is monitored by the microprocessor, thereby detecting a change pattern of rising→constant→falling (first change pattern), and a change pattern of falling→constant→rising (second change pattern). Every time these change patterns are detected, the signal value detection data VD is extracted. The signal value detection data VD extracted upon detection of the first change pattern is recognized as a maximum value $V_{max}$ of the amplitude waveform of the received digital signal RD. The signal value detection data VD extracted upon detection of the second change pattern is recognized as a minimum value $V_{min}$ of the amplitude waveform. When the maximum and minimum values $V_{max}$ and $V_{min}$ are obtained the microprocessor obtains a central value between these maximum and minimum values $V_{max}$ and $V_{min}$. This central value is supplied to the comparison circuit 40 as the reference signal level Vth.

The comparison circuit 40 compares the signal level of the received digital signal RD and the reference signal level Vth output from the level setup circuit 30. The comparison result is output as a decoded signal OD.

The operation of the decoding circuit with the above arrangement will be described below. For example, assume that the received digital signal RD whose DC level is gradually increased, as shown in FIG. 2, is input. In the first detection circuit 10, the plurality of comparators 11 to 1m compare the signal value of the received digital signal RD with the reference voltages $V_{Bl}$ to $V_{Bm}$. Upon reception of these comparison results, the detector 101 detects a voltage range to which the signal value of the received digital signal RD belongs. For example, it is detected that, of the amplitude waveform shown in FIG. 3, a portion 1 belongs to a voltage range between the reference voltages $V_{B3}$ and $V_{B4}$, a portion 2 belongs to a voltage range between the reference voltages $V_{Bi}$ and $V_{Bi+1}$, and a portion 3 belongs to a voltage range between the reference voltages $V_{B4}$ and $V_{B5}$.

On the other hand, in the second detection circuit 20, the signal value of the received digital signal RD is sampled by the two voltage memories 21 and 22 in accordance with the sampling pulses $C_N$ and $C_{N-1}$. The subtracter 23 calculates a difference between the two signal values. More specifically, with this subtraction, a change amount of the signal value of the received digital signal RD in a small region can be obtained. The form discriminator 24 discriminates the change form of the signal value of the received digital signal RD on the basis of the change amount and polarity (positive or negative) of the signal value. For example, since negative signal changes are detected in regions between sampling timings $t_1$ and $t_2$ and between timings $t_{13}$ and $t_{14}$, as shown in FIG. 4, a change form of these regions is discriminated as "falling (−)". Since a change is substantially zero in regions between sampling timings $t_3$ and $t_4$ and between timings $t_{10}$ and $t_{11}$, it is discriminated that a change form of these regions is "constant (0)". Similarly, since a positive signal change is detected in a region between sampling timings $t_7$ and $t_8$, a change form of this region is discriminated as "rising (+)".

In this manner, when the second detection circuit 20 outputs the change form discrimination data HD, the level setup circuit 30 detects a change pattern of the received digital signal RD from the discrimination data HD. For example, in a region between timings t1 to t8 in FIG. 4, a change pattern of "falling→constant→rising" (first change pattern) is detected. In a region between timings $t_6$ and $t_{15}$, a change pattern of "rising-→constant→falling" (second change pattern) is detected. When these detection patterns are detected, the level setup circuit 30 extracts the signal value detection data VD supplied from the first detection circuit 10 during a "constant (0)" period of each detected pattern. For example, from the signal waveform RD shown in FIG. 3, voltage ranges between $V_{B3}$ and $V_{B4}$, between $V_{Bi}$ and $V_{Bi+1}$, and between $V_{B4}$ and $V_{B5}$ are extracted. Each of these extracted voltage ranges is recognized as the maximum value $V_{max}$ or the minimum value $V_{min}$. The central values of these maximum and minimum values $V_{max}$ and $V_{min}$ are calculated, and are supplied to the comparison circuit 40 as new reference signal levels Vth.

Therefore, in, e.g., the received digital signal RD shown in FIG. 2, minimum and maximum values $V_{1min}$ and $V_{1max}$ of the amplitude waveform are detected in a region T1, and the reference signal level Vth is corrected to be the central value of a difference $\Delta V_1$ therebetween. In a region T2, since maximum and minimum values $V_{1max}$ and $V_{2min}$ of the amplitude waveform are detected, the reference signal level Vth is corrected to be the central value of a difference $\Delta V_2$ therebetween. In regions T3 and T4, the central values are respectively obtained based on the maximum and minimum values in these regions, and the reference signal level Vth is corrected to these central values.

In the decoding circuit of this embodiment, the signal value of the received digital signal RD is detected by the first detection circuit 10, and a change form of the signal value of the received digital signal RD is detected by the second detection circuit 20. The maximum and minimum values $V_{max}$ and $V_{min}$ of the adjacent amplitude waveforms are extracted from the detection data VD from the first detection circuit 10 in accordance with the detection data HD of the change form, and the central values of these maximum and minimum values $V_{max}$ and $V_{min}$ are obtained. The reference signal level Vth is corrected to these central values.

Therefore, even if the DC level of the received digital signal RD changes due to any cause, the reference signal level Vth can change to follow the change in DC level, as shown in FIG. 2. Even if the amplitude value of the received digital signal RD changes, the reference signal level Vth can always be set to be the central value of the amplitude waveform without being influenced by the change in amplitude value. For this reason, the received digital signal RD can always be decoded according to the optimal reference signal level Vth. As a result, very stable decoding can be performed regardless of the quality of a transmission system.

Note that the decoding circuit of this embodiment can be modified as follows. More specifically, a circuit for detecting a change in signal value of the received digital signal RD may comprise a conventional differential circuit 26 comprising a capacitor C and a resistor R, as shown in FIG. 5. FIG. 6 shows a detected waveform BS obtained by the differential circuit 26. The first and second detection circuits and the level setup circuit may be constituted by a digital circuit including a microprocessor, and the like. In the above embodiment, the reference signal level is corrected in units of adjacent signal waveforms of the received digital signal RD, but may be corrected in units of a plurality of signal waveforms.

Second Embodiment

Figure 7:
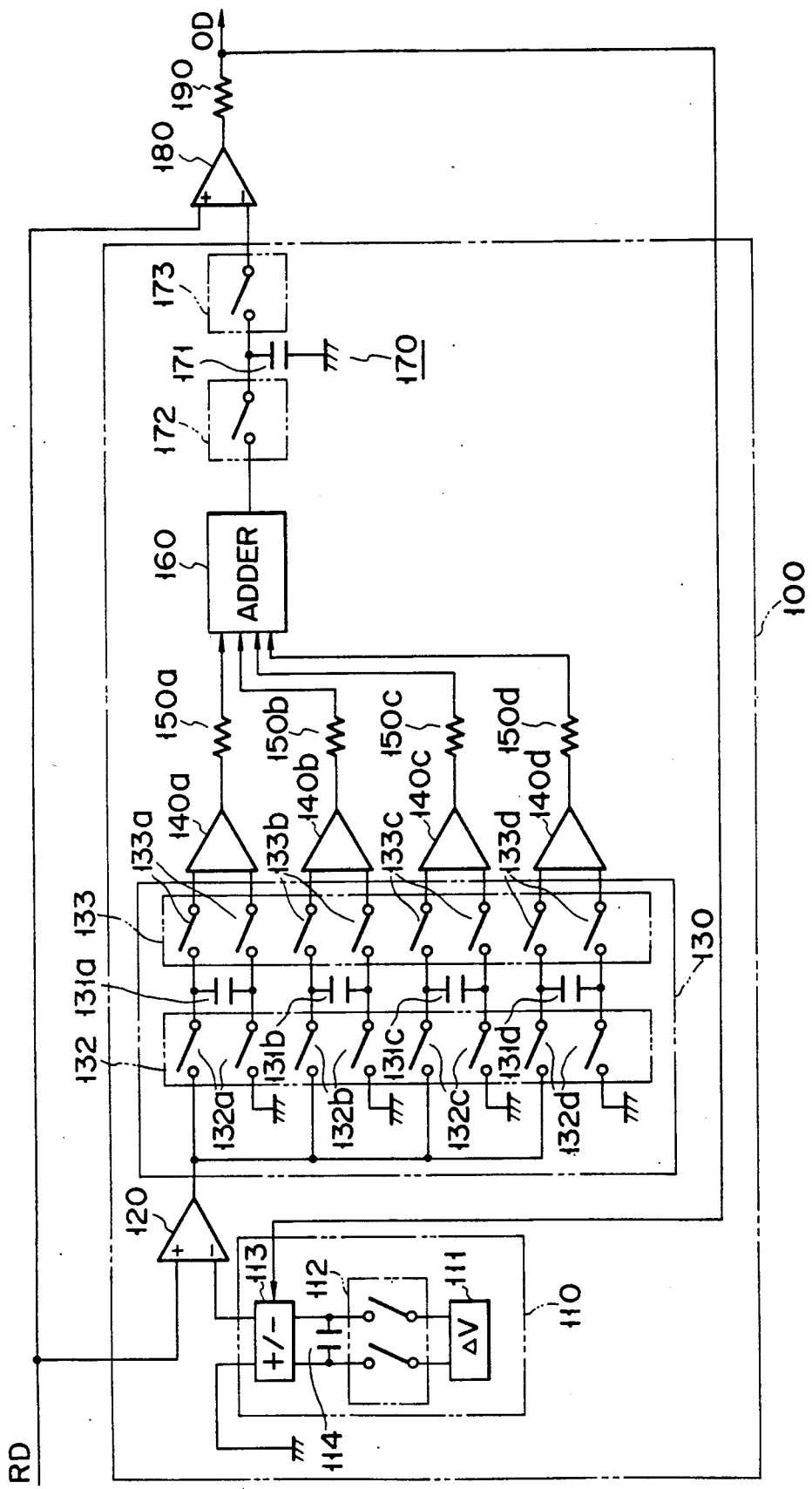
FIG. 7 is a block diagram showing an arrangement of a digital signal decoding circuit according to the second embodiment of the present invention.

FIG. 7 is a block diagram showing an arrangement of a digital signal decoding circuit according to the second embodiment of the present invention.

The digital signal decoding circuit comprises a comparator 180, an output resistor 190, and a reference signal generation circuit 100. The comparator 180 compares a signal value of a received digital signal RD with a reference signal level Vth, and outputs a comparison result. The comparison result output from the comparator 180 is output as a decoded signal OD as the output register 190.

Figure 8:
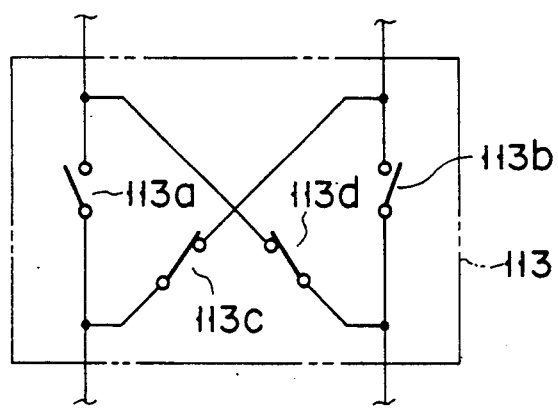
FIG. 8 is a circuit diagram partially showing the decoding circuit shown in FIG. 7.

The reference signal generation circuit 100 comprises an offset voltage generator 110 and a voltage comparator 120. The offset voltage generator 110 comprises a power source 111, a switch 112, a polarity setup circuit 113, and a capacitor 114. In the offset voltage generator 110, an offset voltage ΔV output from the power source 111 is temporarily stored in the capacitor 114 through the switch 112. The polarity setup circuit 113 sets a polarity (positive or negative) of the voltage, and supplies the voltage to the voltage comparator 120. The polarity setup circuit 113 comprises two pairs of switches 113a and 113b, and 113c and 113d which are cascade-connected to each other, as shown in, e.g., FIG. 8. The switches are complementarily turned on/off in accordance with "0" or "1" of the decoded signal OD output from the level comparator 180 (to be described later). Note that the value of the offset voltage ΔV is set to be about ½ of the amplitude value of the received digital signal RD. In the voltage comparator 120, the offset voltage ΔV output from the offset voltage generator 110 is added to the signal value of the received digital signal RD. Thus, a voltage corresponding to the central value of the amplitude of the received digital signal RD is obtained. The voltage corresponding to the central value of the amplitude is supplied to a switched capacitor circuit 130.

The switched capacitor circuit 130 comprises four switched capacitors. These switched capacitors are constituted by capacitors 131a to 131d, charge control switches 132a to 132d, and discharge control switches 133a to 133d. Of these control switches, the charge control switches 132a to 132d are turned on in turn at a predetermined cycle in synchronism with a timing signal generated by a timing signal generator (not shown). The discharge control switches 133a to 133d are simultaneously turned on in synchronism with the timing signal generated by the timing signal generator. Note that ON timings of the charge control switches 132a to 132d and the discharge control switches 133a to 133d are phase-shifted from each other by a ½ phase of a transfer clock CLK.

The four amplitude central values output from the switched capacitor circuit 130 are current-amplified by current amplifiers 140a to 140d, respectively, and the amplified values are supplied to an adder 160 through resistors 150a to 150d. The adder 160 calculates an average value of the four amplitude central values. The calculated average value is supplied to a voltage holding circuit 170. The voltage holding circuit 170 comprises a capacitor 171, and switches 172 and 173 respectively arranged at input and output sides of the capacitor 171. These switches 172 and 173 are turned on/off in synchronism with timing signals generated b the timing signal generator (not shown). In the voltage holding circuit 170, the average value of the amplitude central values, which is output from the adder 160, is supplied to and held in the capacitor 171 when the switch 172 is turned on. The average value held in the capacitor 171 is output when the switch 173 is turned on. This average value is supplied to the level comparator 180 as a reference signal level Vth.

The operation of the digital signal decoding circuit with the above arrangement will be described below. Prior to the operation of the circuit, an amplitude value between "1" and "0" levels of the received digital signal RD is separately detected, and a value ½ of the detected value is set as the offset voltage ΔV in the power source 111 of the offset voltage generator 110. The capacitors 131a to 131d of the switched capacitor circuit 130 respectively store initial amplitude central values by a initial value setup circuit (not shown).

When a digital signal is input in this state, the timing signal generator (not shown) generates a plurality of timing signals in synchronism with the transfer clock CLK of the received digital signal RD. In response to these timing signals, the switches start ON/OFF operations.

Figure 9:
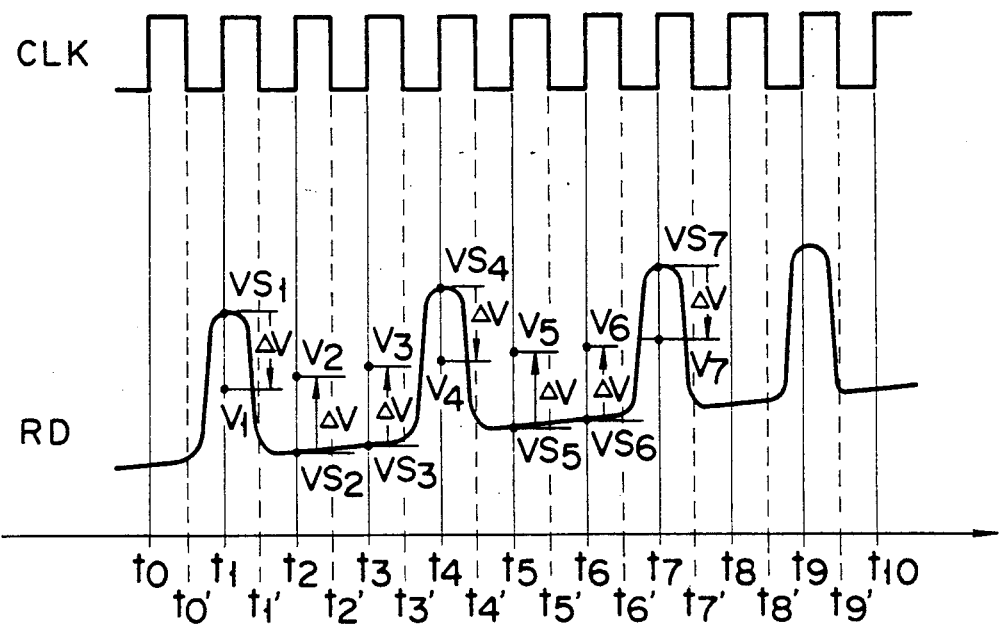
FIGS. 9 and 10 are signal waveform charts for explaining an operation of the decoding circuit shown in FIG. 7.

For example, assume that a received digital signal RD shown in FIG. 9 is input. In synchronism with a first trailing edge $t_0$, of the transfer clock CLK of the received digital signal RD, the switch 112 is turned on, the switches 113a to 113d of the polarity setup circuit 113 are turned off, the charge control switches 132a to 132d of the switched capacitor circuit 130 are turned off, and the discharge control switches 133a to 133d are turned on. In addition, the switches 172 and 173 are respectively turned on and off. For this reason, the initial values of the amplitude central values stored in the capacitors 131a to 131d of the switched capacitor circuit 130 are respectively output, and their average value is calculated by the adder 160. The average value is supplied to and held in the capacitor 171 of the voltage holding circuit 170. That is, a preparation for a level discrimination timing $t_1$ is made.

When a first leading edge $t_1$ of the transfer clock CLK is detected in this state, the switches 172 and 173 of the voltage holding circuit 170 are respectively turned off and on in synchronism with the edge $t_1$. For this reason, the reference signal level Vth is supplied to the level comparator 180. The level comparator 180 performs code discrimination of the received digital signal RD in accordance with the input reference signal level Vth. At the edge $t_1$, the switch 112 is turned off, and the switches 113c and 113d of the polarity setup circuit 113 are turned on in accordance with the level of the decoded signal OD. Thus, the offset voltage $-\Delta V$ is output from the offset voltage generator 110. The offset voltage $-\Delta V$ is added to the signal value of the received digital signal R by the voltage comparator 120. For example, if the signal value of the received digital signal RD is $VS_1$ now, as shown in FIG. 9, $-\Delta V$ is added to the signal value $VS_1$. Therefore, the amplitude central value $V_1$ is output from the voltage comparator 120, as shown in FIG. 9. At the edge $t_1$, of the charge control switches 132a to 132d of the switched capacitor circuit 130, for example, only the switch 132a is turned on, and all the discharge control switches 133a to 133d are turned off. For this reason, the amplitude central value output from the voltage comparator 120 is stored in the capacitor 131a.

When a second trailing edge $t_1$, of the transfer clock CLK is detected, the switches 172 and 173 of the voltage holding circuit 170 are respectively turned on and off. Therefore, no reference signal level Vth is supplied to the level comparator 180. Thus, no level discrimination of the received digital signal RD is executed. At the edge $t_1'$, the switches 113a to 113d of the polarity setup circuit 113 are turned off, and the switches 132 and 133 of the switched capacitor circuit 130 are respectively turned off and on as in the case for the edge $t_0'$. Thus, the amplitude central values held in the capacitors 131a to 131d of the switched capacitor circuit 130 are supplied to the adder 160, and their average value is calculated by the adder 160. The average value is held in the capacitor 171 of the voltage holding circuit 170 as a new reference signal level Vth.

When a second leading edge $t_2$ of the transfer clock CLK is detected, the switches 172 and 173 of the voltage holding circuit 170 are respectively turned off and on in synchronism with the edge $t_2$ as in the case for the edge $t_1$. For this reason, the reference signal level Vth held in the capacitor 171 is supplied to the level comparator 180. The level comparator 180 performs code discrimination of the received digital signal RD in accordance with the reference signal level Vth, thereby outputting a decoded signal OD. In this case, the switch 112 is turned off. Furthermore, the switches 113a and 113b of the polarity setup circuit 113 are turned on in accordance with the level of the decoded signal OD. Thus, the offset voltage generator 110 generates an offset voltage $+\Delta V$. The offset voltage $+\Delta V$ is added to the signal value of the received digital signal RD by the voltage comparator 120. For example, if the signal value of the received digital signal RD is $VS_2$, as shown in FIG. 9, $+\Delta V$ is added to the signal value $V_{S2}$. Therefore, an amplitude central value $V_2$ is output from the voltage comparator 120, as shown in FIG. 9. At this time, in the switched capacitor circuit 130, of the charge control switches 132a to 132d, for example, only the switch 132b is turned on, and all the discharge control switches 133a to 133d are turned off. For this reason, the amplitude central value $V_2$ output from the voltage comparator 120 is held in the next capacitor 131b.

When a second trailing edge $t_2'$ of the transfer clock CLK is detected, the switches 132 and 133 of the switched capacitor circuit 130 are respectively turned on and off as in the case for the edge $t_2'$. For this reason, the amplitude central values held in the capacitors 131a to 131d of the switched capacitor circuit 130 are supplied to the adder 160. The adder 160 calculates an average value of these central values. The average value is held in the capacitor 171 of the voltage holding circuit 170 as a new reference signal level Vth.

When a third leading edge $t_3$ of the transfer clock CLK is detected, the switches 172 and 173 of the voltage holding circuit 170 are turned off and on in synchronism with this edge $t_3$ as in the case for the edges $t_1$ and $t_2$. For this reason, the reference signal level Vth held in the capacitor 171 is supplied to the level comparator 180. The level comparator 180 performs code discrimination of the received digital signal RD in accordance with the reference signal level Vth. At this time, the offset voltage $+\Delta V$ output from the offset voltage generator 110 is added to a signal value $VS_3$ of the received digital signal RD. For this reason, the voltage comparator 120 outputs an amplitude central value $V_3$ corresponding to the signal value $VS_3$. The amplitude central value $V_3$ is held in the capacitor 131c of the switched capacitor circuit 130.

Thereafter, at trailing edges $t_3'$, $t_4'$, ... of the transfer clock CLK, new reference signal levels Vth are generated based on amplitude central values held in the capacitors 131a to 131d of the switched capacitor circuit 130 On the other hand, at leading edges $t_4$, $t_5$, ... of the transfer clock CLK, code discrimination of the received digital signal RD is performed in accordance with the corresponding reference signal levels Vth. Amplitude central values according to signal values of the received digital signal RD are obtained, and are sequentially held in the capacitors 131a to 131d of the switched capacitor circuit 130. In this manner, in the decoding circuit of this embodiment, "1" or "0" of each bit of the received digital signal RD in discriminated according to the reference signal level Vth. An offset value $-\Delta V$ or $+\Delta V$ prepared in advance is added to a signal value VS of the received digital signal RD, thus obtaining an amplitude central value of the received digital signal RD. The new amplitude central value is held in the capacitors 131a to 131d of the switched capacitor circuit 130 together with amplitude central values obtained at three previous successive bits of interest. The adder 160 obtains the average value of the amplitude central values, which is used as a new reference signal level Vth for the next bit of interest.

Figure 10:
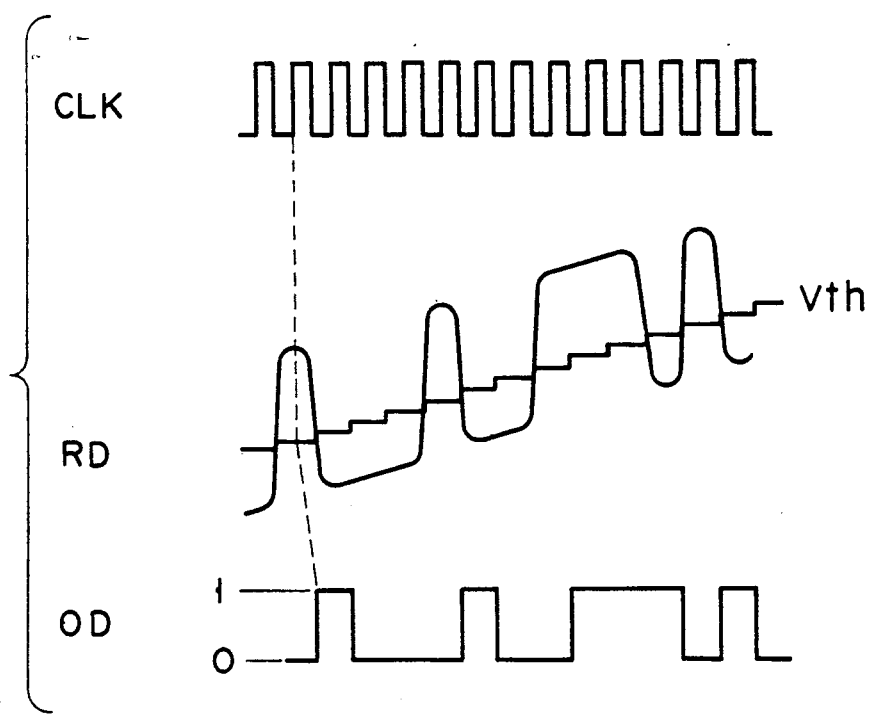

Therefore, even if the DC level of the received digital signal RD changes due to any cause, the reference signal level Vth changes to follow the change in DC level, as shown in, e.g., FIG. 10. For this reason, the received digital signal RD can always be decoded in accordance with the optimal reference signal level Vth. In addition, in this embodiment, when the reference signal level Vth is set, an average value of amplitude central values for a plurality of previous successive bits is calculated. This average value is set as a new reference signal level Vth. For this reason, even if the signal value of the received digital signal RD temporarily largely changes at an arbitrary bit due to noise components, the influence of a temporary change in signal value can be reduced, and a stable reference signal level can be set. Therefore, stability of a decoding operation can be improved.

In this embodiment the following modifications are available. More specifically, a reference signal level need not be varied for each bit of interest but may be varied in units of a predetermined number of bits. In addition, the number of bits of interest referred when a reference signal level is obtained, i.e., the number of switched capacitors, and arrangements of the offset voltage generator, a circuit for obtaining an amplitude central value, a storage circuit, and the like may be modified.

Third Embodiment

FIG. 11 is a block diagram showing an arrangement of a digital signal decoding circuit according to the third embodiment of the present invention.

The decoding circuit has a control circuit 201. The control circuit 201 comprises a microprocessor (CPU). The CPU 201 is connected to a ROM 202, a RAM 203, an input buffer latch 204, and a PPI (programmable peripheral interface; e.g., 8255A available from Intel Corp.) 205 through a bus. The ROM 202 prestores a control program necessary for decoding processing of a received digital signal RD. The RAM 203 stores various data generated during decoding processing. The buffer latch 204 is connected to an analog-to-digital (A/D) converter 206. The A/D converter 206 samples a signal value of the received digital signal RD in units of bits in synchronism with a transfer clock CLK. The sampled signal value VS is converted to a digital value, and is input to the buffer latch 204. Note that reference numeral 207 denotes an input buffer for supplying the received digital signal RD to the A/D converter 206; and 208, an input buffer for supplying the transfer clock CLK synchronous with the received digital signal RD to the A/D converter 206.

The PPI 205 is connected to a dip switch 209, and an output latch 210. The dip switch 209 is used to input a fixed amplitude value $\Delta V$ as one parameter necessary for decoding. The fixed amplitude value $\Delta V$ is set to be a value ½ of an amplitude value between "1" and "0" of a standard received digital signal RD. The output latch 210 comprises, e.g., a D flip-flop (D-FF). The output latch 210 temporarily latches code discrimination data output from the PPI 205, and outputs it as decoded data OD. The latching operation is performed in synchronism with the transfer clock CLK which is inverted by an inverter 211.

The operation of the circuit with the above arrangement will be described below. Prior to the operation of the circuit, an operator separately detects an amplitude value between "1" and "0" of the received digital signal RD, and sets a value ½ of the detected amplitude value as the fixed amplitude value $\Delta V$ using the dip switch 209.

When a power switch is turned on in this state, the CPU 201 executes predetermined initialization processing, and sets its operation mode in an interrupt disable mode in step 2a, as shown in FIG. 12. The CPU 201 clears data stored in the RAM 203 in step 2b, and initializes the PPI 205 in step 2c. Thus, the fixed amplitude value $\Delta V$ set in the dip switch 209 is loaded to the CPU 201 through the PPI 205. The CPU 201 stores the fixed amplitude value $\Delta V$ in a predetermined area of the RAM 203 in step 2d. After the fixed amplitude value $\Delta V$ is stored, the CPU 201 sets its operation mode in an interrupt enable mode in step 2e, and then executes decoding processing as follows.

Figure 13:
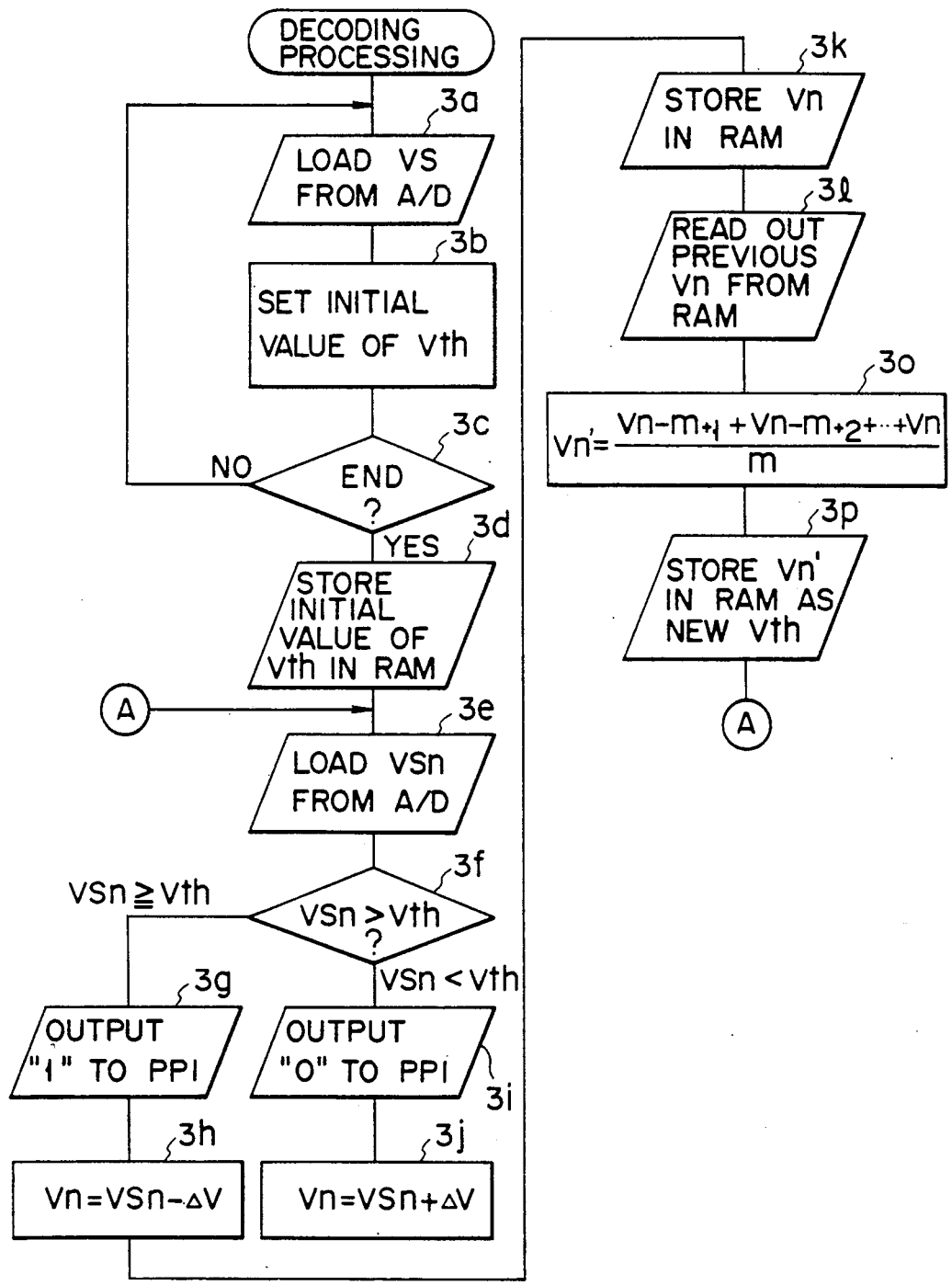

More specifically, during a preamble period set at the starting portion of the received digital signal RD, an initial value of a reference signal level Vth is set. During the preamble period, the received digital signal RD has a repetition pattern of "1"s and "0"s. A signal value of the repetition pattern is sampled by the A/D converter 206 for each bit of interest, and is converted to a digital value. Every time the CPU 201 receives an interrupt signal INT synchronous with the transfer clock CLK from the inverter 211, it loads a digital signal value VS of the repetition pattern from the A/D converter 206 through the buffer latch 204 in step 3a, as shown in FIG. 13. In step 3b, the CPU 201 executes processing for obtaining a DC level of the received digital signal RD from the digital signal value VS. After the DC level is obtained in this processing, the CPU 201 sets an initial value of the reference signal level Vth in accordance with this DC level value. The above-mentioned processing is repeated until an initial value of a stable reference signal level Vth is obtained in steps 3a to 3c. After the initial value of the stable reference signal level Vth is obtained, it is stored in the RAM 203 in step 3d.

After the initial value of the reference signal level Vth is set, the CPU 201 loads a digital signal value $VS_n$ of the received digital signal RD from the A/D converter 206 through the buffer latch 204 in step 3e. In step 3f, the CPU 201 reads out the reference signal level Vth from the RAM 203, and compares the level of the digital signal value $VS_n$ with the reference signal level Vth. As a result of comparison, if it is determined that the digital signal value $VS_n$ is equal to or higher than the reference signal level Vth, it is determined that the code of the bit of interest of the received digital signal RD input at this time is "1", and the flow advances to step 3g. In step 3g, a "1" discrimination signal is output to the PPI 205. On the other hand, if it is determined that the digital signal value $VS_n$ is lower than the reference signal level Vth, it is determined that the code of the bit of interest of the received digital signal RD at this time is "0", and the flow advances to step 3i. In step 3i, a "0" discrimination signal is output to the PPI 205. These "1" and "0" discrimination signals are output from the PPI 205 to the D-FF 210, and are latched thereby in synchronism with the transfer clock CLK. Thereafter, these signals are output as decoded signals OD.

In the decoding circuit of this embodiment, updating processing of the reference signal level Vth is executed every time one bit of the received digital signal RD is decoded, as described above. More specifically, every time a discrimination signal is output for one bit of interest, the CPU 201 executes the following processing. That is, when data "1" is output as the discrimination signal, the flow advances to step 3h. In step 3h, the fixed amplitude value $\Delta V$ stored in the RAM 203 is subtracted from the digital signal value $VS_n$. On the other hand, when data "0" is output, the flow advances to step 3j. In step 3j, the fixed amplitude value $\Delta V$ is added to the digital signal value $VS_n$. With the subtraction or addition, an amplitude central value of the bit of interest of the received digital signal RD is calculated.

Assuming that a received digital signal shown in FIG. 9 of the second embodiment is input, a digital signal value $VS_1$ detected by the A/D converter 206 is determined to be "1" at a bit of interest $t_1$. For this reason, the fixed amplitude value $\Delta V$ is subtracted from the digital signal value $VS_1$, thus calculating an amplitude central value $V_1$ at the bit of interest $t_1$. At the next bit of interest $t_2$, a digital signal value $VS_2$ detected by the A/D converter 206 is determined to be "0". For this reason, the fixed amplitude value $\Delta V$ is added to the digital signal value $VS_2$, thus calculating an amplitude central value $V_2$ of the bit of interest $t_2$. Similarly, at bit positions $t_3, t_4, \ldots$ the fixed amplitude value $\Delta V$ is subtracted from or added to digital signal values $VS_3, VS_4$, detected by the A/D converter 206 in accordance with the discrimination results of "1" or "0", thereby calculating amplitude central values $V_3, V_4, \ldots$ of corresponding bits of interest of the received digital signal RD. The amplitude central value $V_n$ is transferred from the CPU 201 and stored in RAM 203 in step 3k (FIG. 13).

Upon completion of storage of the amplitude central value $V_n$, the CPU 201 reads out amplitude central values $V_{n-m+1}', V_{n-m+2}', \ldots, V_n$ of previous m successive bits including the present amplitude central value $V_n$ in step 3l. In step 3o, the CPU 201 calculates an average value $V_{n'}$ of these m amplitude central values $V_{n-m+1}, V_{n-m+2}, \ldots, V_n$ The CPU 201 stores the calculated average value $V_{n'}$ in the RAM 203 as a new reference signal level Vth. The new reference signal level Vth is used for the next bit of interest $t_{n+1}$. For example, assume that m=5, and a new reference signal level Vth used for the next bit of interest t8 is set at a bit of interest t7 shown in FIG. 9 under this condition. In step 3l, previous 5-bit amplitude central values $V_3, V_4, V_5, V_6,$ and $V_7$ including $V_7$ are read out from the RAM 203. In step 3o, an average value $V_{7'}$ of these 5-bit amplitude central values $V_3, V_4, V_5, V_6,$ and $V_7$ is calculated. The average value $V_{7'}$ is stored in the RAM 203 as a new reference signal level Vth used at the next bit position t8. In this case, the old reference signal level stored in the RAM 203 is erased.

Upon completion of the reference signal level Vth for one bit of interest, the CPU 201 causes the flow to return to step 3e in FIG. 13. The CPU 201 then discriminates a signal value, and updates the reference signal level Vth at the next bit of interest $t_{n+1}$. The CPU 201 repeats the above-mentioned control in units of bits of interest.

In the decoding circuit of this embodiment, a signal value $V_n$ of the received digital signal RD is detected by the A/D converter 206 in units of bits of interest. The digital signal value $VS_n$ detected by the A/D converter 206 is compared with the reference signal level Vth, thus discriminating a code "1" or "0" of the bit of interest. The predetermined fixed amplitude value $\Delta V$ is added to or subtracted from the digital signal value $VS_n$, thus calculating an amplitude central value $V_n$ of the received digital signal RD. This amplitude central value $V_n$ is updated to be a new reference signal level Vth used for the next bit of interest.

Therefore, even if the DC level of the received digital signal RD changes due to any cause, the reference signal level Vth changes to follow the change in DC level, as shown in, e.g., FIG. 10. For this reason, the received digital signal RD can always be decoded in accordance with the optimal reference signal level Vth. In addition, in this embodiment, when the reference signal level Vth is set, an average value of amplitude central values for a plurality of previous successive bits is calculated. This average value is set as a new reference signal level. For this reason, even if the signal value of the received digital signal RD temporarily largely changes at an arbitrary bit due to noise components, the influence of a temporary change in signal value can be reduced, and a stable reference signal level can be set. Therefore, stability of a decoding operation can be improved. Furthermore, in this embodiment, processing for discriminating a code "1" or "0" of the received digital signal RD and for updating the reference signal level Vth is executed by a digital circuit including the CPU 201. For this reason, high-precision decoding can be executed.

This embodiment can be modified as follows. For example, the reference signal level need not be updated in units of bits but may be updated in units of a predetermined number of bits. In this manner, the load of the CPU 201 can be reduced, and a higher-speed received digital signal can be processed accordingly. The reference signal level may be manually input by the dip switch together with the fixed amplitude value. In this case, another input means such as a ten-key pad may be used as an input means. Contrary to this, the fixed amplitude value may be automatically set based on the signal level of the received digital signal as well as the reference signal level. In addition, the number of bits to be looked up upon calculation of a reference signal level, control sequences and control contents of the CPU, and the like may be modified.

Fourth Embodiment

Figure 14:
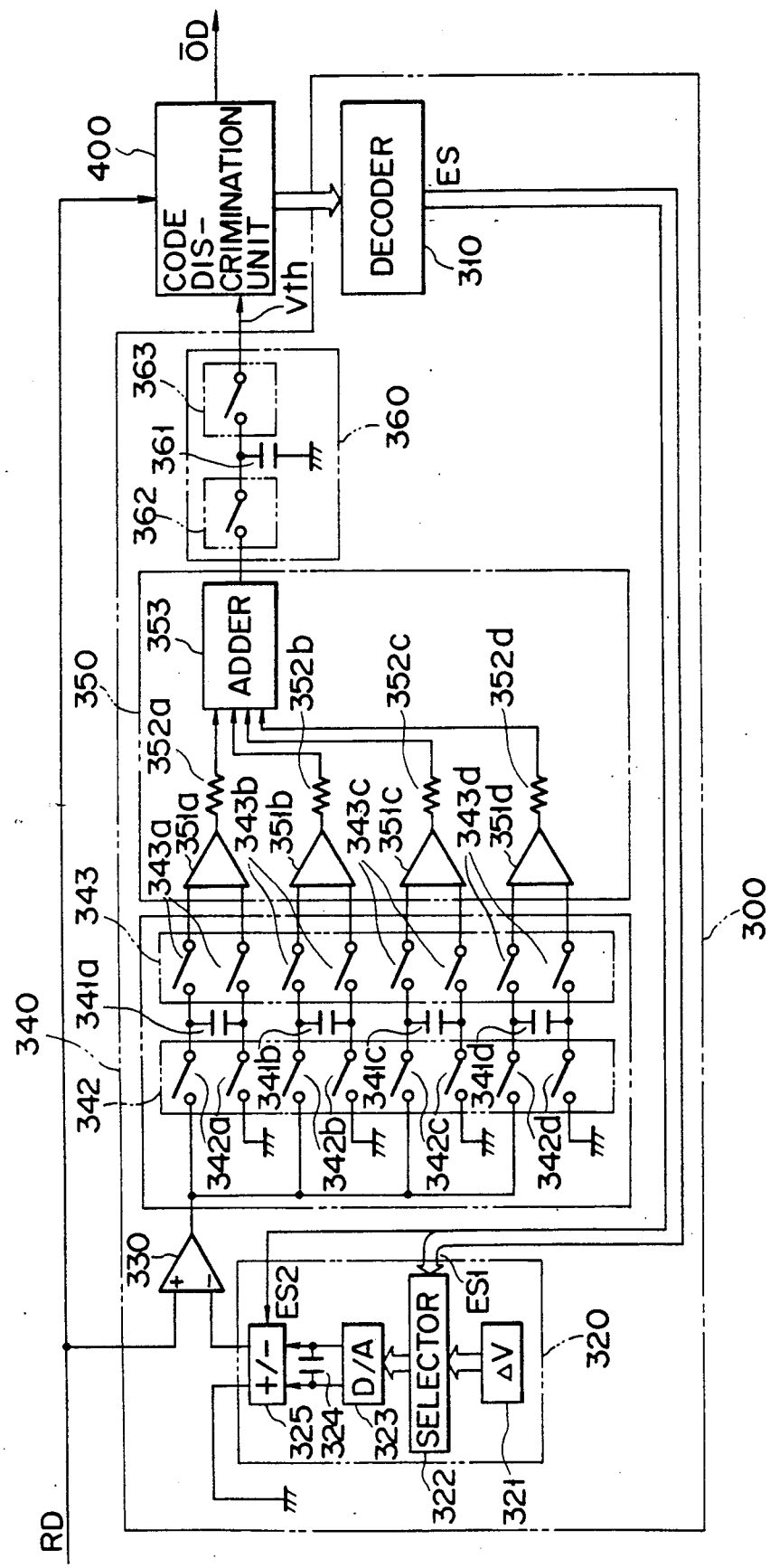
FIG. 14 is a block diagram showing an arrangement of a digital signal decoding circuit according to the fourth embodiment of the present invention.

FIG. 14 is a block diagram showing an arrangement of a digital signal decoding circuit according to the fourth embodiment of the present invention.

The digital signal decoding circuit comprises a code discrimination unit 400, and a reference signal generation unit 300.

Of these units, the code discrimination unit 400 comprises a discrimination level generation circuit 410, a comparison circuit 420, and a code discrimination circuit 440, as shown in, e.g., FIG. 15. Note that reference numeral 310 (FIG. 15) denotes a decoder for the reference signal generation unit 300 (to be described later).

The discrimination level generation circuit 410 comprises adders 411 and 412, subtracters 413 and 414, and variable resistors $VR_1$, $VR_2$, $VR_3$, and $VR_4$. These variable resistors $VR_1$, $VR_2$, $VR_3$, and $VR_4$ supply predetermined two of each type of addition and subtraction voltages to the adders 411 and 412, and the subtracters 413 and 414, respectively. The adders 411 and 412 add the corresponding addition voltages to a reference signal level Vth, thereby generating two different discrimination levels Vth1 and Vth2 higher than the reference signal level Vth. The subtracters 413 and 414 subtract the corresponding subtraction voltages from the reference signal level Vth, thereby generating two different discrimination levels Vth3 and Vth4 lower than the reference signal level Vth. These discrimination levels Vth1, Vth2, Vth3, and Vth4 satisfy the following relation:

$$Vth1 > Vth2 > Vth > Vth3 > Vth4$$

Figure 16:
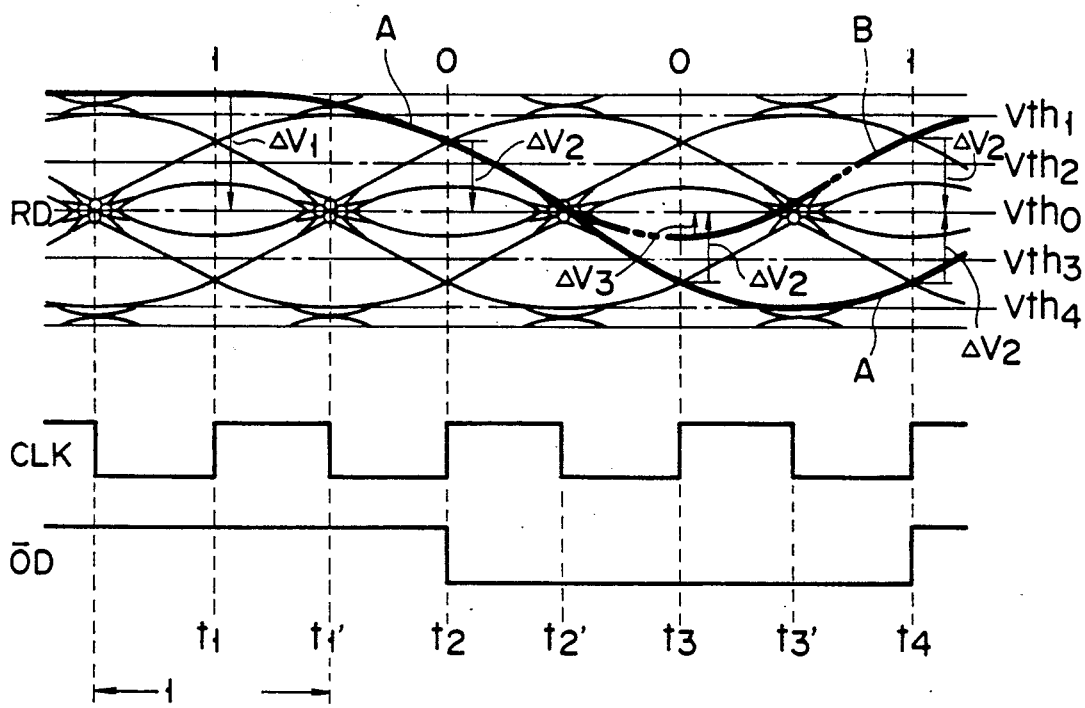
FIGS. 16 and 17 are signal waveform charts for explaining an operation of the decoding circuit shown in FIG. 14.
Figure 17:
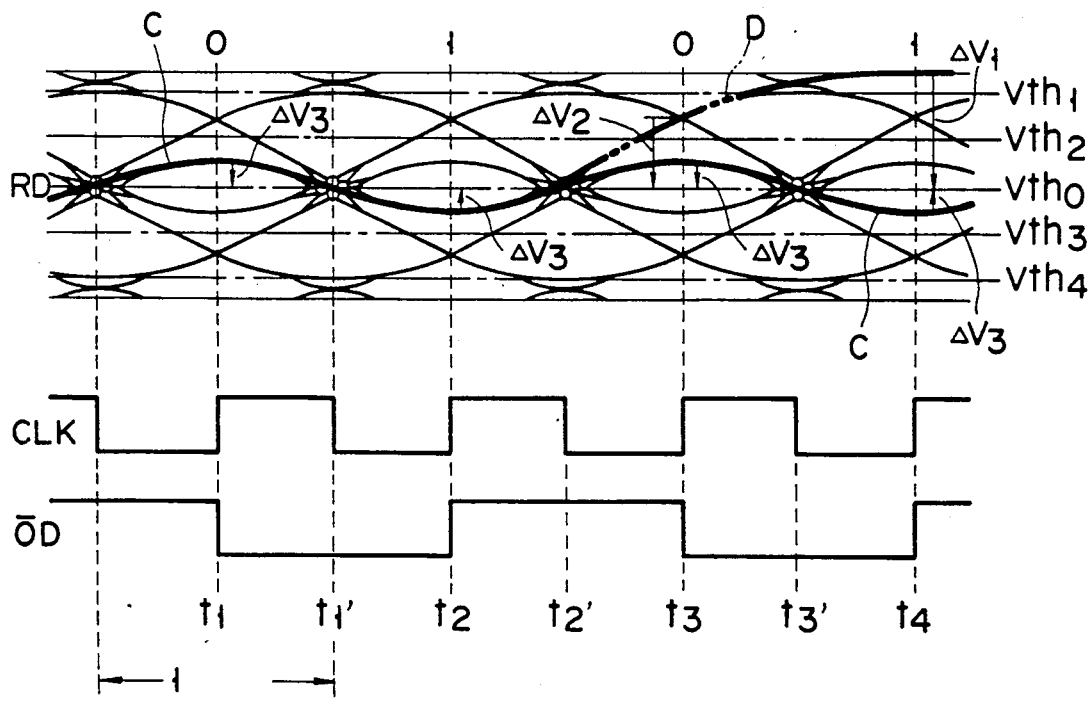

These discrimination level values are set to be values capable of identifying signal values forming eye patterns of the received digital signal RD, as shown in FIG. 16 or 17.

The comparison circuit 420 comprises five comparators 430 to 434. Of these comparators 430 to 434, the comparator 430 directly receives the reference signal level Vth as a discrimination level Vth0. The comparator 430 compares a signal value of the received digital signal RD with the discrimination level Vth0. The remaining comparators 431 to 434 respectively receive the discrimination levels Vth1, Vth2, Vth3, and Vth4 generated by the adders 41 and 412 and the subtracters 413 and 414. These comparators 431 to 434 compare the signal value of the received digital signal with the discrimination levels Vth1, Vth2, Vth3, and Vth4, respectively. The comparison outputs of these comparators 430 to 434 are supplied to the code discrimination circuit 440.

The code discrimination circuit 440 comprises a decoder 441 and a 1-bit delay circuit 442. The 1-bit delay circuit 442 delays comparison outputs G0 to G4 output from the comparators 430 to 434 by one bit of the received digital signal RD, and supplies the delayed signals to the decoder 441. The decoder 441 comprises, e.g., a ROM. This ROM prestores code discrimination results OD corresponding to all the combinations of the comparison outputs G0 to G4 and the delayed comparison outputs G0' to G4'. Address input terminals of the decoder 441 receive the comparison outputs G0 to G4 and the comparison outputs G0' to G4' delayed by one bit by the 1-bit delay circuit 442 as an address. When this address is supplied, a code discrimination result OD corresponding to the comparison results G0 to G4 and G0' to G4' is read out from the decoder 441.

The reference signal generation unit 300 comprises the decoder 310 as an offset control circuit, an offset voltage generation circuit 320, a voltage comparator 330, a switched capacitor circuit 340, an average circuit 350, and a voltage holding circuit 360.

The decoder 310 comprises, e.g., a ROM. The ROM prestores optimal offset data ES corresponding to the comparison outputs of the comparators 430 to 434. The offset data ES consists of digital values ES1 of three different offset voltages $\Delta V_1$, $\Delta V_2$, and $\Delta V_3$, and data ES2 representing the polarities of the offset voltages $\Delta V_1$, $\Delta V_2$, and $\Delta V_3$. The offset voltages $\Delta V_1$, $\Delta V_2$ and $\Delta V_3$ are set to satisfy:

$$\Delta V_1 > \Delta V_2 > \Delta V_3$$

These offset voltages $\Delta V_1$, $\Delta V_2$, and $\Delta V_3$ are set to have values, as shown in FIG. 16 or 17. The offset data ES is supplied to the offset voltage generation circuit 320.

The offset voltage generation circuit 320 comprises an initial value generator 321, a selector 322, a digital-to-analog (D/A) converter 323, a capacitor 324, and a polarity setup circuit 325. The initial value generator 321 generates a digital value of an initial offset voltage $\Delta V$. The selector 322 selectively outputs the digital value of the initial offset voltage, and the digital value ES1 of the offset voltage $\Delta V$ supplied from the decoder 310 The D/A converter 323 converts the digital value of the offset voltage output from the selector 322 into an analog value. The capacitor 324 temporarily stores the offset voltage output from the D/A converter 323. The polarity setup circuit 325 sets the positive or negative polarities of the offset voltages $\Delta V$, $\Delta V_1$, $\Delta V_2$, and $\Delta V_3$ in accordance with the polarity data ES2 supplied from the decoder 310, and supplies the voltages with the setup polarities to the voltage comparator 330. Note that the arrangement of the polarity setup circuit 325 is the same as that of the polarity setup circuit 113 shown in FIG. 8 in the second embodiment.

The voltage comparator 330 adds the offset voltages $\Delta V$, $\Delta V_1$, $\Delta V_2$, and $\Delta V_3$, or $-\Delta V$, $\Delta V_1$, $-\Delta V_2$, and $-\Delta V_3$ to the signal value of the received digital signal RD. Thus, amplitude central values of the received digital signal RD are calculated. The amplitude central values are supplied to the switched capacitor circuit 340.

The switched capacitor circuit 340 comprises four switched capacitors. These switched capacitors include capacitors 341a to 341d, charge control switches 342a to 342d, and discharge control switches 343a to 343d. The charge control switches 342a to 342d are sequentially turned on in synchronism with timing signals generated by a timing signal generator (not shown) in synchronism with the transfer clock CLK. The discharge control switches 343a to 343d are simultaneously turned on in synchronis with the timing signals generated by the timing signal generator. Note that ON timings of the charge control switches 342a to 342d and the discharge control switches 343a to 343d are phase-shifted from each other by a ¼ phase of a transfer clock CLK of the received digital signal RD.

The average circuit 350 comprises current amplifiers 351a to 351d, resistors 352a to 352d, and an adder 353. The current amplifiers 351a to 351d current-amplify the four amplitude central values output from the corresponding switched capacitors to predetermined current values, respectively. The amplified amplitude central values are supplied to the adder 353 through the resistors 352a to 352d, respectively. The adder 353 calculates an average value of the four amplitude central values, and supplies it to the voltage holding circuit 360.

The voltage holding circuit 360 comprises a capacitor 361, and two switches 362 and 363. These switches 362 and 363 are turned on to be delayed from each other by a ½ bit in accordance with timing signals generated by the timing signal generator (not shown). The capacitor 361 holds the average value output from the adder 35 when the switch 362 is turned on. The capacitor 361 supplies the held average value to the code discrimination unit 400 as the reference signal level Vth when the switch 363 is turned on.

The operation of the digital signal decoding circuit with the above arrangement will be described below. Note that the decoder (ROM) 441 of the code discrimination unit 400 prestores data representing code discrimination results corresponding to the comparison results of the signal value of the received digital signal RD. The decoder 310 of the reference signal generation unit 300 prestores offset data corresponding to the comparison results.

An initial value of the amplitude central value is stored in the capacitors 341a to 341d of the switched capacitor circuit 340 to initialize the decoding circuit. In order to store this value, the selector 322 of the offset voltage generation circuit 320 is switched to the initial value generator 321 side. All the charge control switches 342a to 342d of the switched capacitor circuit 340 are set ON, and all the discharge control switches 343a to 343d are set OFF. A standard received digital signal RD is input to one input terminal of the voltage comparator 330. The standard received digital signal is artificially generated by a simulator.

In this manner, the initial value data generated by the initial value generator 321 is input to the D/A converter 323. The D/A converter 323 outputs an initial offset voltage $\Delta V$ corresponding to the input initial value data. The initial offset voltage $\Delta V$ is added to the standard received digital signal RD by the voltage comparator 330. Therefore, the voltage comparator 330 outputs a DC voltage corresponding to the amplitude central value of the standard received digital signal, i.e., the initial amplitude central value. The initial amplitude central value output from the voltage comparator 330 is charged in the capacitors 341a to 341d, respectively. The capacitors 341a to 341d of the switched capacitor circuit 340 respectively store the initial amplitude central value. After this initialization, the selector 322 is switched to the decoder 310 side.

When a received digital signal RD is input to the decoding circuit in this state, the timing signal generator (not shown) generates a plurality of timing signals. These timing signals are synchronous with the transfer clock CLK of the received digital signal RD. The decoding circuit starts an operation for decoding the received digital signal RD in synchronism with these timing signals.

For example, assume that the received digital signal RD shown in FIG. 9 is input. In this case, a case will be examined wherein amplitude values for "1" and "0" are respectively constant for the sake of simplicity.

In synchronism with the first trailing edge $t_0'$ of the transfer clock CLK of the received digital signal RD, the switches of the polarity setup circuit 325 are turned off. All the charge control switches 342a to 342d of the switches capacitor circuit 340 are turned off, and all the discharge control switches 343a to 343d are turned on. In addition, the switches 362 and 363 of the voltage holding circuit 360 are respectively turned on and off. For this reason, the initial amplitude central values stored in the capacitors 341a to 341d are read out from the switched capacitor circuit 340. The average value of the initial amplitude central values is calculated by the average circuit 350. The average value is supplied to and stored in the capacitor 361 of the voltage holding circuit 360 as an initial reference signal level Vth. That is, a preparation for a code discrimination timing $t_1$ is made.

Assume that the timing signals are generated by the timing signal generator (not shown) in synchronism with the first leading edge t1 of the transfer clock CLK in this state. The switches 362 and 363 of the voltage holding circuit 360 are respectively turned off and on. Thus, the initial reference signal level stored in the capacitor 361 is supplied to the code discrimination unit 400.

In the code discrimination unit 400, the discrimination level generator 410 generates four discrimination levels Vth1 to Vth4 on the basis of the initial reference signal level Vth. The comparators 430 to 434 of the comparison circuit 420 compare the signal value of the received digital signal RD with the initial reference signal level Vth (discrimination level Vth0) and the discrimination levels Vth1 to Vth4, thus detecting the signal value of the received digital signal RD. These comparison results G0 to G4 are input to the decoder 441 and the 1-bit delay circuit 442 of the code discrimination circuit 440. Thus, a code discrimination result corresponding to the comparison results G0 to G4 and the comparison results G0' to G4' delayed by one bit by the 1-bit delay circuit 442 is read out from the decoder 441. Note that at the code discrimination timing $t_1$ in FIG. 9, since the signal value of the received digital signal RD is sufficiently higher than the reference signal level, a code discrimination result "1" is output.

The comparison results G0 to G4 are also input to the decoder 310 of the reference signal generation unit 300. The decoder 310 then outputs offset data ES according to the comparison results. At the discrimination timing $t_1$, since the signal level of the received digital signal RD is sufficiently high, as shown in FIG. 9, for example, data ES1 representing the offset voltage $\Delta V_1$ and the polarity data ES2 representing that the voltage $\Delta V_1$ is higher than the reference signal level Vth0 are output. These data ES1 and ES2 are supplied to the D/A converter 323 and the polarity setup circuit 32 of the offset voltage generation circuit 320. Thus, the D/A converter 323 outputs the offset voltage $\Delta V_1$ according to the offset data ES1, and supplies it to the polarity setup circuit 325 through the capacitor 324. The switches in the polarity setup circuit 325 are switched to a state wherein polarity inversion is performed. For this reason, the polarity of the offset voltage $\Delta V_1$ is inverted to the negative polarity (−), and the inverted voltage is supplied to the voltage comparator 330. The offset voltage $\Delta V_1$ is added to the signal value of the received digital signal RD by the voltage comparator 330. For example, if the received digital signal RD has a present signal value $VS_1$, as shown in FIG. 9, $-\Delta V_1$ is added to the signal value $VS_1$. Therefore, an amplitude central value $V_1$ is output from the voltage comparator 330, as shown in FIG. 9.

At the code discrimination timing $t_1$, of the charge control switches 342a to 342d of the switched capacitor circuit 340, for example, only the switch 342a is turned on. All the discharge control switches 343a to 343d are turned off. For this reason, the amplitude central value $V_1$ output from the voltage comparator 330 is stored in the capacitor 341a.

Assume that the timing signal is output from the timing signal generator in synchronism with a second trailing edge $t_1'$ of the transfer clock CLK. All the charge control switches 342a to 342d of the switched capacitor circuit 340 are turned off. All the discharge control switches 343a to 343d are turned on. In addition, the switches 362 and 363 of the voltage holding circuit 360 are respectively turned on and off. For this reason, the amplitude central values stored in the capacitors 341a to 341d are read out from the switched capacitor circuit 340 and are supplied to the adder 353 of the average circuit 350. Thus, the adder 353 calculates the average value of the amplitude central values. This average value is stored in the capacitor 361 of the voltage holding circuit 360 as a new reference signal level Vth used for code discrimination of the next bit of interest.

Assume that the timing signal is generated from the timing signal generator in synchronism with a second leading edge $t_2$ of the transfer clock. In response to this timing signal, the switches 362 and 363 of the voltage holding circuit 360 are respectively turned on and off. For this reason, the reference signal level Vth stored in the capacitor 361 is supplied to the code discrimination unit 400. In the comparison circuit 420 of the code discrimination unit 400, the signal value of the received digital signal RD is detected using the reference signal level Vth (discrimination level Vth0) and the four discrimination levels Vth1 to Vth4 generated based on the reference signal level Vth. Upon reception of this detection result, the decoder 441 performs code discrimination based on the input detection result and the detection result delayed by one bit by the 1-bit delay circuit 442.

The decoder 310 outputs offset data ES1 and ES2 according to the signal value of the received digital signal RD detected by the comparison circuit 420 of the code discrimination unit 400. For this reason, the D/A converter 323 of the offset voltage generation circuit 320 outputs an offset voltage according to the offset data ES1, e.g., $\Delta V_1$ (FIG. 9). According to the polarity data ES2, the polarity setup circuit 325 is set in a state wherein polarity conversion is disabled. Thus, the offset voltage $\Delta V_1$ output from the D/A converter 323 is supplied to the voltage comparator 330 while its positive polarity is left unchanged. The voltage comparator 330 adds the offset voltage $\Delta V_1$ to the signal value of the received digital signal RD. For example, if the received digital signal RD has a signal value $VS_2$, as shown in FIG. 9, $+\Delta V_1$ is added to the signal value $VS_2$. Therefore, the voltage comparator 330 outputs an amplitude central value $V_2$, as shown in FIG. 9. At this time, of the charge control switches 342a to 342d of the switched capacitor circuit 340, for example, only the switch 342b is turned on. For this reason, the amplitude central value $V_2$ output from the voltage comparator 330 is stored in the capacitor 341b.

When a timing signal is generated from the timing signal generator in synchronism with a third trailing edge $t_2'$ of the transfer clock CLK, the switches 342 and 343 of the switched capacitor circuit 340 are respectively turned off and on as in the case for the edge $t_1'$. For this reason, the amplitude central values stored in the capacitors 341a to 341d of the switched capacitor circuit 340 are supplied to the average circuit 350, and their average value is calculated by the adder 353 of the average circuit 350. The average value is stored in the capacitor 361 of the voltage holding circuit 360 as a ne reference signal level Vth used for code discrimination of the next bit of interest ($t_3$).

When a timing signal is output from the timing signal generator in synchronism with a third leading edge $t_3$ of the transfer clock CLK, the switches 362 and 363 of the voltage holding circuit 360 are respectively turned off and on as in the case for the edges $t_1$ and $t_2$. Thus, the reference signal level Vth stored in the capacitor 361 is supplied to the code discrimination unit 400. The code discrimination unit 400 detects the signal value of the received digital signal RD using the reference signal level Vth (discrimination level Vth0) and the four discrimination levels Vth1 to Vth4 generated based on the reference signal level Vth. The code discrimination unit 400 then performs code discrimination of the received digital signal RD using the detection result of the present signal value and the detection result delayed by one bit.

The offset voltage generation circuit 320 generates a predetermined offset voltage, e.g., $+\Delta V$ according to a signal value of the received digital signal at the edge $t_3$ according to offset data ES1 and ES2 generated by the decoder 310. The offset voltage $+\Delta V$ is added to the signal value $VS_3$ of the received digital signal RD by the voltage comparator 330. Thus, an amplitude central value $V_3$ corresponding to the signal value $VS_3$ is obtained. The amplitude central value $V_3$ is stored in the capacitor 341c of the switched capacitor circuit 340.

Similarly, at the trailing edges $t_3'$, $t_4'$, . . . of the transfer clock CLK, new reference signal levels Vth used for code discrimination of the next bits of interest are generated on the basis of the corresponding amplitude central values stored in the capacitors 341a to 341d of the switched capacitor circuit 340. Each new reference signal level Vth is stored in the capacitor 361 of the voltage holding circuit 360.

On the other hand, at the leading edges $t_4, t_5, \ldots$ of the transfer clock CLK, code discrimination of the received digital signal RD is performed by the code discrimination unit 400 on the basis of the reference signal level Vth (discrimination level Vth0 and four discrimination levels Vth1 to Vth4 generated based on the reference signal level Vth. Amplitude central values according to signal values of the received digital signal RD are obtained by the decoder 310, the offset voltage generation circuit 320, and the voltage comparator 330. These amplitude central values are sequentially stored in the capacitors 341a to 341d of the switched capacitor circuit 340.

Therefore, according to this embodiment, the amplitude central value of the received digital signal RD is obtained by the reference signal generation unit 300 on the basis of the signal values of the received digital signal RD detected during code discrimination of the received digital signal RD by the code discrimination unit 400. A reference signal level Vth used for code discrimination of the next bit of interest is generated on the basis of this amplitude central value. For this reason, even if the DC level of the received digital signal RD changes due to any cause, the reference signal level Vth changes to follow the change in DC level, as shown in, e.g., FIG. 10. For this reason, the received digital signal RD can always be decoded in accordance with the optimal reference signal level Vth.

In addition, according to this embodiment, when a reference signal level Vth is set, an average value of previous four successive bit amplitude central values is calculated, and is set as a new reference signal level Vth. For this reason, even if the signal value of the received digital signal RD temporarily largely changes at an arbitrary bit due to noise components, the influence of a temporary change in signal value can be reduced, and a stable reference signal level can be set. Therefore, stability of a decoding operation can be improved.

The above description has been made under a condition that the amplitude value of the received digital signal RD has a small change. The amplitude value of the received digital signal RD normally changes according to a code pattern of the received digital signal RD depending on characteristics of a filter arranged in a decoding circuit. When "1"s or "0"s successively appear, the amplitude value of the received digital signal RD becomes a maximum value. In contrast to this, when "1"s and "0"s alternately appear at a relatively short cycle, the amplitude value of the received digital signal RD becomes a low value which does not reach the maximum value. In this case, when code discrimination is performed by merely comparing the signal value of the received digital signal RD with one reference signal level Vth, accurate code discrimination may often be prevented depending on a code pattern of the received digital signal RD.

In this embodiment, however, such a drawback is eliminated as follows. More specifically, at each code discrimination timing, the reference signal level Vth output from the voltage holding circuit 360 is input to the discrimination level generator 410 of the code discrimination unit 400, as has been described above. The discrimination level generator 410 generates the four discrimination levels Vth1 to Vth4 based on the reference signal level Vth. These discrimination levels Vth1 to Vth4 are respectively input to the comparators 430 to 434 of the comparison circuit 420 together with the reference signal level Vth (discrimination level Vth0). These comparators 430 to 434 compare the received digital signal RD and the discrimination levels Vth0 to Vth4. The comparators 430 to 434 output the comparison results as "H" or "L" signals.

The discrimination levels Vth0 to Vth4 are set to have values capable of reliably identifying signal values even when the received digital signal RD forms any eye patterns, as shown in, e.g., FIG. 16 or 17. Therefore, assuming that a received digital signal RD having an eye pattern A in FIG. 16 is input, all the comparators 430 to 434 output comparison results G0 to G4 at "H" level at a code discrimination timing $t_1$. At a code discrimination timing $t_2$, comparison results in which only G1 goes to "H" level and other results go to "L" level are output. Similarly, at code discrimination timings $t_3$ and $t_4$, comparison results in which only G4 goes to "H" level and other results go to "L" level are output.

When a received digital signal RD having an eye pattern C in FIG. 17 is input, comparison results in which G1 and G2 go to "L" level and G0, G3, and G4 go to "H" level are output at timings $t_1$ and $t_3$. At timings $t_2$ and $t_4$, comparison results in which G0, G1, and G2 go to "L" level, and G3 and G4 go to "H" level are output. More specifically, the comparators 430 to 434 of the comparison circuit 420 detect signal values at corresponding code discrimination timings of the received digital signal RD.

The comparison results G0 to G4 output from the comparators 430 to 434 are supplied to the decoder 441 of the code discrimination circuit 440. The decoder 441 performs code discrimination of the received digital signal RD on the basis of the comparison results G0 to G4 and the comparison results G0' to G4' delayed by one bit by the 1-bit delay circuit 442.

For example, when a received digital signal having an eye pattern A shown in FIG. 16 is input, code discrimination is performed as follows. At a code discrimination timing $t_1$, all the comparison results G0 to G4 at that time are at "H" level. In addition, the comparison results G0' to G4' delayed by one bit are also at "H" level. For this reason, the decoder 441 outputs a discrimination result "1" as a decoded digital signal OD. At a code discrimination timing $t_2$, of the comparison results G0 to G4, only G1 goes to "L" level, and other results go to "H" level. However, all the comparison results G0' to G4' delayed by one bit are at "H" level, as described above. For this reason, the decoder 441 outputs a discrimination result "0" as a decoded digital signal OD. More specifically, in this case, since the signal value of the received digital signal RD is equal to or higher than the reference signal level Vth0, a code seems to be "1". However, if this signal value truly has "1" level, the signal value should be left unchanged at a maximum value. In this case, since the signal value is decreased, "0" is determined.

At a code discrimination timing $t_3$, of the comparison results G0 to G4, only G4 goes to "H" level, and other results go to "L" level. Of the comparison results G0' to G4' delayed by one bit, only G1' goes to "L" level, and other results go to "H" level, as described above. For this reason, the decoder 441 outputs a discrimination result "0" as a decoded digital signal OD. In contrast to this, when G0, G1, and G2 = "L" and G3 and G4 = "H" level at a code discrimination timing as shown in an eye pattern B in FIG. 16, the signal value becomes smaller than that one bit before, and is lower than the reference signal level Vth0. For this reason, a code seems to be "0". However, in this case, since the signal value is higher than a signal value to be discriminated as "0", a discrimination result "1" is output unlike in the eye pattern A.

At a code discrimination timing $t_4$, of the comparison results G0 to G4 and comparison results G0' to G4' delayed by one bit, only G4 and G4' go to "H" level, and other results go to "L" level. For this reason, decoder 441 outputs a discrimination result "1". More specifically, the signal value is lower than the reference signal level Vth0, and is equal to the signal value one bit before which was determined to be "0". For this reason, the discrimination result seems to be "0". However, if the result is truly "0", the signal value should be decreased to a minimum value, and comparison results G0 to G4 should go to "L" level accordingly. However, since none of them go to "L" level, a discrimination result "1" is determined.

When a received digital signal RD including a repetition pattern of "1"s and "0"s is input, as shown in an eye pattern C in FIG. 17, code discrimination is performed as follows. More specifically, at a code discrimination timing $t_2$, of the comparison results G0 to G4, G0, G1, and G2 go to "L" level, and G3 and G4 go to "H" level. In this case, of the comparison results G0' to G4' delayed by one bit, G1' and G2' go to "L" level, and G0', G3', and G4' go to "H" level. For this reason, a discrimination result "1" is output from the decoder 441 as a decoded digital signal OD. In this case, the signal value is lower than a signal value one bit before, and is lower than the reference signal level Vth0. For this reason, the discrimination result seems to be "0". However, if the result is truly "0", only G4 of the comparison results G0 to G4 should go to "H" level, and other results should go to "L" level. In this case, since the signal value is higher than a signal value to be determined as "0", a discrimination result "1" is determined.

At the next timing $t_3$, of the comparison results G0 to G4 at this time, G1 and G2 go to "L" level, and G0, G3, and G4 go to "H" level. However, of the comparison results G0' to G4' delayed by one bit, G0', G1', and G2' are at "L" level, and G3' and G4' are at "H" level, as described above. For this reason, the decoder 441 outputs a discrimination result "0" level as a decoded digital signal OD. In contrast to this, assume that the signal value of the received digital signal RD changes as shown in an eye pattern D in FIG. 17. Thus, at the timing $t_3'$ only G1 of the comparison results G0 to G4 goes to "L" level, and other results go to "H" level. For this reason, the decoder 441 outputs a discrimination result "1".

When an offset voltage value is fixed to one value to set a reference signal level Vth, if the amplitude value of the received digital signal RD changes depending on a code pattern, as shown in FIGS. 16 and 17, the reference signal level Vth cannot be accurately set. In this embodiment, however, this problem is solved as follows.

The comparison results G0 to G4 output from the comparators 430 to 434 of the code discrimination unit 400 are supplied to the decoder 310. The decoder 310 selects an optimal offset voltage according to the comparison results G0 to G4, i.e., the signal value of the received digital signal RD. For example, at a code discrimination timing $t_1$ in FIG. 16, all the comparison results G0 to G4 go to "H" level. The decoder 310 selects an offset voltage $\Delta V_1$ having a largest absolute value from the three different offset voltages $\Delta V_1$, $\Delta V_2$, and $\Delta V_3$ ($\Delta V_1 > \Delta V_2 > \Delta V_3$). The decoder 310 then outputs offset data ES representing the selected offset voltage $\Delta V_1$. Thus, the offset voltage generation circuit 320 generates an offset voltage $-\Delta V_1$ according to the offset data ES. The offset voltage $-\Delta V_1$ is added to the signal value of the received digital signal RD by the voltage comparator 330, thus obtaining an amplitude central value of the received digital signal RD.

At a code discrimination timing $t_2$ in FIG. 16, of the comparison results G0 to G4, only G1 goes to "L" level, and other results go to "H" level. For this reason, the decoder 310 selects an offset voltage $\Delta V_2$ from the three different offset voltages $\Delta V_1$, $\Delta V_2$ and $\Delta V_3$, and outputs offset data ES representing the selected voltage $\Delta V_2$. Therefore, the offset voltage generation circuit 320 generates an offset voltage $-\Delta V_2$. The voltage comparator 330 adds the offset voltage $-\Delta V_2$ to the signal value of the received digital signal RD, thus obtaining an amplitude central value of the received digital signal RD.

Similarly, at a code discrimination timing $t_3$ in FIG. 16 or at a level discrimination timing $t_1$ or $t_2$ in FIG. 17, the decoder 310 outputs offset data ES representing smallest $\Delta V_3$ of the three different offset voltages $\Delta V_1$, $\Delta V_2$, and $\Delta V_3$. For this reason, the offset voltage generation circuit 320 generates an offset voltage $\Delta V_3$. The voltage comparator 330 adds the offset voltage $\Delta V_3$ to the signal value of the received digital signal RD, thus obtaining an amplitude central value of the received digital signal RD.

In the decoding circuit of this embodiment, the discrimination level generation circuit 410 of the code discrimination unit 40 generates four discrimination levels Vth1 to Vth4 on the basis of the reference signal level Vth. The signal value of the received digital signal RD is detected using these discrimination levels Vth1 to Vth4 and the reference signal level Vth. The code discrimination circuit 440 performs code discrimination of the received digital signal RD on the basis of the comparison results G0 to G4 and the comparison results G0' to G4' delayed by one bit. On the other hand, the decoder 310 selects an optimal offset voltage according to the amplitude value of the received digital signal RD from the three different offset voltages $\Delta V_1$, $\Delta V_2$, and $\Delta V_3$ in accordance with the comparison results G0 to G4. The selected offset voltage is added to the signal value of the received digital signal RD by the voltage comparator 330, thereby obtaining an amplitude central value of the received digital signal RD. The reference signal level Vth is updated based on this amplitude central value.

According to this embodiment, even if an amplitude value of the received digital signal RD changes depending on a code pattern due to the influence of filter characteristics, code discrimination of the received digital signal RD can be accurately performed without errors.

Fifth Embodiment

The fifth embodiment of the present invention will be described below. A difference between this embodiment and the fourth embodiment described above is as follows. That is, in the fourth embodiment, an optimal offset voltage is generated according to the detection result of a signal value of the received digital signal RD, and is added to the received digital signal RD to obtain an amplitude central value of the received digital signal RD. The average circuit 350 calculates an average value of amplitude central values obtained from a plurality of successive bits of interest, and supplies it to the code discrimination unit 400 as a reference signal level Vth used in code discrimination of the next bit of interest.

Contrary to this, according to this embodiment, in accordance with a detection result of a signal value of the received digital signal RD, an initial signal value Vf closest to this signal value is generated, and a difference between the initial signal value Vf and the signal value of the received digital signal RD is calculated. More specifically, a change amount of the actual received digital signal RD with respect to the initial signal value is obtained. An average value of a plurality of change amounts obtained at a plurality of successive bits of interest is obtained, and is added to or subtracted from an initial reference signal level Vth, thereby obtaining a reference signal level Vth used in code discrimination of the next bit of interest.

FIG. 18 is a block diagram showing an arrangement of a digital signal decoding circuit according to the fifth embodiment. The same reference numerals in FIG. 18 denote the same parts as in FIG. 14, and a detailed description thereof will be omitted.

Figure 19:
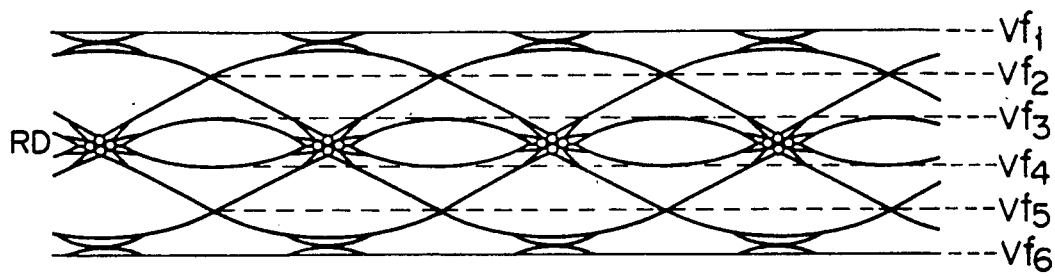
FIGS. 19 and 20 are signal waveform charts for explaining an operation of the decoding circuit shown in FIG. 18.

A reference signal generation unit 500 includes a decoder 311. The decoder 311 comprises, e.g., a ROM. The ROM prestores digital values F of initial signal values closest to signal values of a received digital signal RD. For example, if an eye pattern of the received digital signal RD is as shown in FIG. 19, six initial signal values $Vf_1$ to $Vf_{60}$ in FIG. 19 are set. The ROM receives comparison results G0 to G4 output from a comparison circuit 440 of a code discrimination unit 400 as an address.

A digital initial signal value FS read out from the decoder 311 is supplied to a D/A converter 323. The D/A converter 323 converts the digital initial value signal value FS into an analog initial signal value Vf, and supplies it to a voltage comparator 330. The voltage comparator 330 detects a change amount of the signal value of the received digital signal RD with respect to the analog initial signal value Vf, and supplies the detected amount to a switched capacitor circuit 340. For this reason, capacitors 341a to 341d of the switched capacitor circuit 340 store change amounts of signal values of the received digital signal RD with respect to the analog initial signal value Vf. The change amounts stored in the capacitors 341a to 341d are supplied to an average circuit 550. In the average circuit 550, an adder 353 calculates an average value of the change amounts. The average value of the change amounts is added to an initial value of a reference signal level Vth by an adder 354. More specifically, the average circuit 550 can obtain a corrected reference signal level which includes a change amount of a DC component of the actual received digital signal RD. The corrected reference signal level is temporarily stored in a voltage holding circuit 360, and is then supplied to the code discrimination unit 400 to be used in code discrimination for the next bit of interest. Note that the initial value of the reference signal level Vth is generated by a voltage generator 355.

Figure 20:
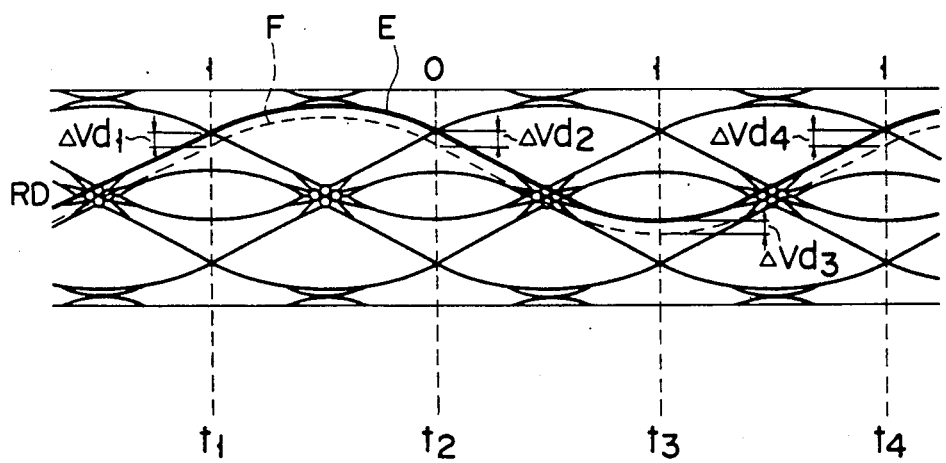

In the decoding circuit described above, assume that a received digital signal RD indicated by a broken curve F in FIG. 20 is input. At code discrimination timings $t_1$ and $t_2$, initial signal values Vf2 closest to detected signal values are output from the D/A converter 323. As a result, the voltage comparator 330 obtains change amounts $\Delta Vd_1$ and $\Delta Vd_2$ of an actual received signal value F with respect to the initial signal value Vf2. At code discrimination timings $t_3$ and $t_4$, initial signal values Vf4 and Vf2 closest to detected signal values are output from the D/A converter 323. The voltage comparator 330 obtains change amounts $\Delta Vd_3$ and $\Delta Vd_4$ of the actual received signal value F with respect to the initial signal values Vf4 and Vf2. These change amounts $\Delta Vd_1$, $\Delta Vd_2$, $\Delta Vd_3$, and $\Delta Vd_4$ are respectively stored in the capacitors 341a to 341d of the switched capacitor circuit 340. Thereafter, these change amounts are read out and input to the adder 353 of the average circuit 550. The adder 353 calculates the average value of the change amounts. The adder 354 adds the average value to the initial reference signal level. Therefore, the average circuit 550 can output a reference signal level Vth including a change component of a DC level of the received digital signal RD.

Therefore, when code discrimination is performed by the code discrimination unit 400 on the basis of the reference signal level Vth determined in this manner, accurate code discrimination can be executed without being influenced by a DC variation of the received digital signal RD. In the decoding circuit of this embodiment, the change amount of a DC level of the received digital signal is added to the initial reference signal level, as described above, thereby setting a new reference signal level. For this reason, even when an amplitude value of the received digital signal RD changes depending on a code pattern due to the influence of filter characteristics, a reference discrimination of the received digital signal RD can be performed without errors.

Additional advantages and modifications will readily occur to those skilled in the art. Therefore, the invention in its broader aspects is not limited to the specific details, representative devices, and illustrated examples shown and described herein. Accordingly, various modifications may by without departing from the spirit or scope of the general inventive concept as defined by the appended claims and their equivalents.

What is claimed is:

1. A digital signal decoding circuit comprising:
   detection means for detecting data indicative of a DC level of a received digital signal in each bit of interest of the received digital signal;
   means for determining a change form of the received digital signal, and determining when said change form indicates a maximum signal to produce a first indication, and a maximum signal to produce a second indication;

reference signal generation means for generating a reference signal having a signal value according to the data associated with the DC level detected by said detection means at a time of said first or second indications; and discrimination means for comparing a signal value of the received digital signal with the signal value of the reference signal generated by said reference signal generation means to discriminate a code of the each bit of interest.

2. A circuit according to claim 1, wherein said detection means comprises:

means for obtaining a maximum value and a minimum value of an amplitude of each bit of interest of the received digital signal at times of said first and second indications by said change rate determining means; and means for obtaining a central value of the amplitude of the received digital signal on the basis of the maximum and minimum values detected by said maximum and minimum value detecting means.

3. A circuit according to claim 1, wherein said detection means comprises:

means for detecting either maximum or minimum values of an amplitude of each bit of interest of the received digital signal at times of said first and second indications by said change rate determining means; and means for adding a predetermined offset value to the minimum value in response to a detection of the minimum value or subtracting the predetermined offset value from the maximum value in response to a detection of the maximum value to obtain a central value of the amplitude of the received digital signal.

4. A digital signal decoding method comprising the steps of:

detecting data associated with a DC level of a received digital signal in each bit of interest of the received digital signal;

means for determining a change form of the received digital signal, and determining when said change form indicates a maximum signal to produce a first indication, and a minimum signal to produce a second indication;

generating a reference signal having a signal value according to the data associated with the DC level detected by the detecting step at a time of said first or second indications; and comparing a signal value of the received digital signal with the signal value of the reference signal to discriminate a code of the bit of interest.

5. A digital signal decoding circuit as in claim 1, further comprising:

average value obtaining means for obtaining an average value of the data associated with the DC levels detected at a plurality of bits of interest by said detection means;

and wherein said reference signal generating means generates said reference signal having a signal value according to the average value obtained by said average value obtaining means.

6. A digital signal decoding circuit comprising:

detection means for detecting a signal value of an amplitude of each bit of interest of the received digital signal;

intermediate value obtaining means for calculating a predetermined offset value with the signal value detected by said detection means to obtain an intermediate value of an amplitude of the received digital signal;

average value obtaining means for obtaining an average value of the data associated with the intermediate values obtained at a plurality of bits of interest by said intermediate value obtaining means;

reference signal generating means for generating a reference signal having a signal value according to the data associated with the average value obtained by said average value obtaining means; and discrimination means for comparing a signal value of the received digital signal with the signal value of the reference signal generated by said reference signal generation means to discriminate a code of the each bit of interest.

7. A digital signal decoding circuit comprising:

signal value detection means for detecting a signal value of a received digital signal on the basis of a signal value of a reference signal in each bit of interest of the received digital signal;

code discrimination means, every time said signal value detection means detects a signal value at a new bit of interest, for discriminating a code of the new bit of interest of the received digital signal on the basis of the signal value detected at the new bit of interest and a signal value detected at a previous bit of interest;

DC data detection means, every time said signal value detection means detects the signal value at the new bit of interest, for generating a parameter value according to the signal value detected at the new bit of interest, and detecting data associated with a DC level of the received digital signal on the basis of the parameter value and the signal value of the new bit of of interest of the received digital signal;

average value obtaining means for obtaining an average value of data associated with the DC level detected by said DC data detection means and data associated with a DC level detected at a previous bit of interest; and new reference signal generation means for generating a ne reference signal having a signal value according to the average value obtained by said average value detection means and supplying the new reference signal to said signal value detection means.

8. A circuit according to claim 7, wherein said signal value detection means comprises:

threshold value generation means for generating a plurality of threshold values on the basis of a signal value of the reference signal; and signal level comparison means for comparing the signal value of the received digital signal with the plurality of threshold values generated by said threshold value generation means in each bit of interest of the received digital signal and outputting comparison results, and said code discrimination means comprises means for discriminating a code of the bit of interest on the basis of the comparison results of the new bit of interest output from said signal level comparison means and the comparison results at least at one previous bit of interest.

9. A circuit according to claim 7, wherein said DC data detection means comprises:
offset value generation means for generating an optimal offset value according to the signal value detected by said signal value detection means; and
central value obtaining means for obtaining an amplitude central value of the received digital signal by using the offset value generated by said offset value generation means, and
said average value obtaining means comprises:
storage means for storing the amplitude central value obtained by said central value obtaining means together with an amplitude central value obtained at least at one previous bit of interest; and
arithmetic means for obtaining an average value of a plurality of amplitude central stored in said storage means.

10. A circuit according to claim 7, wherein said DC data detection means comprises:
initial signal value generation means for generating an initial signal value closest to the signal value detected by said signal value detection means; and
change amount detection means for detecting a change amount of the signal value of the received digital signal with respect to the initial signal value generated by said initial signal value generation means;
said average value obtaining means comprises:
storage means for storing the change amount detected by said change amount detection means together with a change amount detected at least at one previous bit of interest;
arithmetic means for calculating an average value of a plurality of change amounts stored in said storage means; and
said reference signal level generation means comprises means for selectively adding and subtracting the average value of the change amounts calculated by said arithmetic means and from the initial value of the reference signal to generate a reference signal having a signal value according to the calculation output, and supplying the reference signal to said signal value detection means.

11. A digital signal detecting circuit comprising:
detection means for detecting either maximum or minimum values of an amplitude of each bit of interest of the received digital signal;
central value obtaining means for adding a predetermined offset value to the minimum value in response to a detection of the minimum value, or subtracting the predetermined offset value from the maximum value in response to a detection of the maximum value to obtain a central value of the amplitude of the received digital signal;
reference signal generation means for generating a reference signal having a signal value based on the data associated with the central value obtained by said central value obtaining means; and
discrimination means for comparing a signal value of the received digital signal with the signal value of the reference signal generated by said reference signal generation means to discriminate a code of the each bit of interest.

12. A digital signal decoding circuit comprising:
detection means for detecting data associated with a DC level of a received digital signal in each bit of interest of the received digital signal;
storage means for every time the data associated with a DC level at a new bit of interest is detected by said detection means, storing the data associated with the DC level at the new bit of interest together with data associated with a DC level detected at least at one previous bit of interest;
average value obtaining means for reading out a plurality of data associated with the DC levels from said storage means and obtaining the average value of the plurality of data;
reference signal generating means for generating a reference signal having a signal value according to the average value obtained by said average value obtaining means; and
discrimination means for comparing a signal value of the received digital signal with the signal value of the reference signal generated by said reference signal generation means to discriminate a code of a new bit of interest.

13. A digital signal decoding circuit comprising:
detection means for detecting a signal value of an amplitude of each bit of interest of the received digital signal;
intermediate value obtaining means for calculating a predetermined offset value with the signal value detected by said detection means to obtain an intermediate value of an amplitude of the received digital signal;
reference signal generation means for generating a reference signal having a signal value according to the data associated with the intermediate value obtained by said intermediate value obtaining means; and
discrimination means for comparing a signal value of the received digital signal with the signal value of the reference signal generated by said reference signal generation means to discriminate a code of the each bit of interest.

* * * * *